United States Patent
Kattepur et al.

(10) Patent No.: US 12,528,191 B2
(45) Date of Patent: Jan. 20, 2026

(54) SYSTEMS AND METHODS FOR TIMED PLAN VERIFICATION AND STRATEGY SYNTHESIS FOR MULTI-ROBOT COORDINATION

(71) Applicant: Telefonaktiebolaget LM Ericsson (publ), Stockholm (SE)

(72) Inventors: Ajay Kattepur, Bangalore (IN); Swarup Kumar Mohalik, Bangalore Karnataka (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 265 days.

(21) Appl. No.: 18/259,514

(22) PCT Filed: Dec. 29, 2020

(86) PCT No.: PCT/IN2020/051064
§ 371 (c)(1),
(2) Date: Jun. 27, 2023

(87) PCT Pub. No.: WO2022/144907
PCT Pub. Date: Jul. 7, 2022

(65) Prior Publication Data
US 2024/0051141 A1 Feb. 15, 2024

(51) Int. Cl.
*B25J 9/16* (2006.01)
(52) U.S. Cl.
CPC .......... *B25J 9/1682* (2013.01); *B25J 9/1669* (2013.01); *B25J 9/1674* (2013.01)

(58) Field of Classification Search
CPC ...... B25J 9/1682; B25J 9/1669; B25J 9/1674; G05B 2219/39158
See application file for complete search history.

(56) References Cited

U.S. PATENT DOCUMENTS

| | | | |
|---|---|---|---|
| 2014/0336818 A1* | 11/2014 | Posselius | B25J 9/1679 700/248 |
| 2018/0178376 A1* | 6/2018 | Lalonde | B25J 9/0084 |
| 2019/0212752 A1* | 7/2019 | Fong | G05D 1/6987 |

(Continued)

OTHER PUBLICATIONS

Orlandini, IEEE, Controller_Synthesis_for_Safety_Critical_Planning (Year: 2013).*

(Continued)

*Primary Examiner* — Adam R Mott
*Assistant Examiner* — Sagar Kc
(74) *Attorney, Agent, or Firm* — Weisberg I.P. Law, P.A.

(57) ABSTRACT

According to one or more embodiments, a node for temporal plan verification and timed game automata, TIGA, controller strategy synthesis for coordination of a plurality of agents is provided. The node includes processing circuitry that is configured to determine a first model of a plurality of temporal plans for timed operations of the plurality of agents violates at least one predefined safety rule, generate the TIGA controller strategy for controlling the timed operations of at least a subset of the plurality of agents where the TIGA controller strategy meets the at least one predefined safety rule and being based on the first model, and cause transmission of the TIGA controller strategy to a dispatch device for translating the TIGA controller strategy to instructions for the plurality of agents.

16 Claims, 20 Drawing Sheets

(56) References Cited

U.S. PATENT DOCUMENTS

2019/0351542 A1* 11/2019 Buerger .................. B25J 9/0084
2020/0238513 A1* 7/2020 Ben-Tsvi ............... B25J 9/1661

OTHER PUBLICATIONS

International Search Report and Written Opinion dated Apr. 20, 2021 for International Application No. PCT/IN2020/051064 filed Dec. 29, 2020, consisting of 9-pages.
A. Kattepur et al.; AI planning and verification for Industry 4.0; Aug. 18, 2020, consisting of 14-pages.
A. Orlandini et al.; TGA-Based Controllers for Flexible Plan Execution; Oct. 4, 2011, consisting of 13-pages.
A. Orlandini et al.; Controller Synthesis for Safety Critical Planning; 2013 IEEE 25th International Conference on Tools with Artificial Intelligence; Nov. 2013, consisting of 8-pages.
F. Cassez et al.; Efficient On-the-Fly Algorithms for the Analysis of Timed Games; CONCUR 2005—Concurrency Theory; Lecture Notes in Computer Science, vol. 3653; 2005, consisting of 20-pages.
R. Inam et al.; Risk Assessment for Human-Robot Collaboration in an automated warehouse scenario; 2018 IEEE 23rd International Conference on Emerging Technologies and Factory Automation (ETFA); 2018, consisting of 9-pages.
J. Huang et al.; ROSRV: Runtime Verification for Robots; RV 2014; Lecture Notes in Computer Science, vol. 8734; 2014, consisting of 8-pages.

* cited by examiner

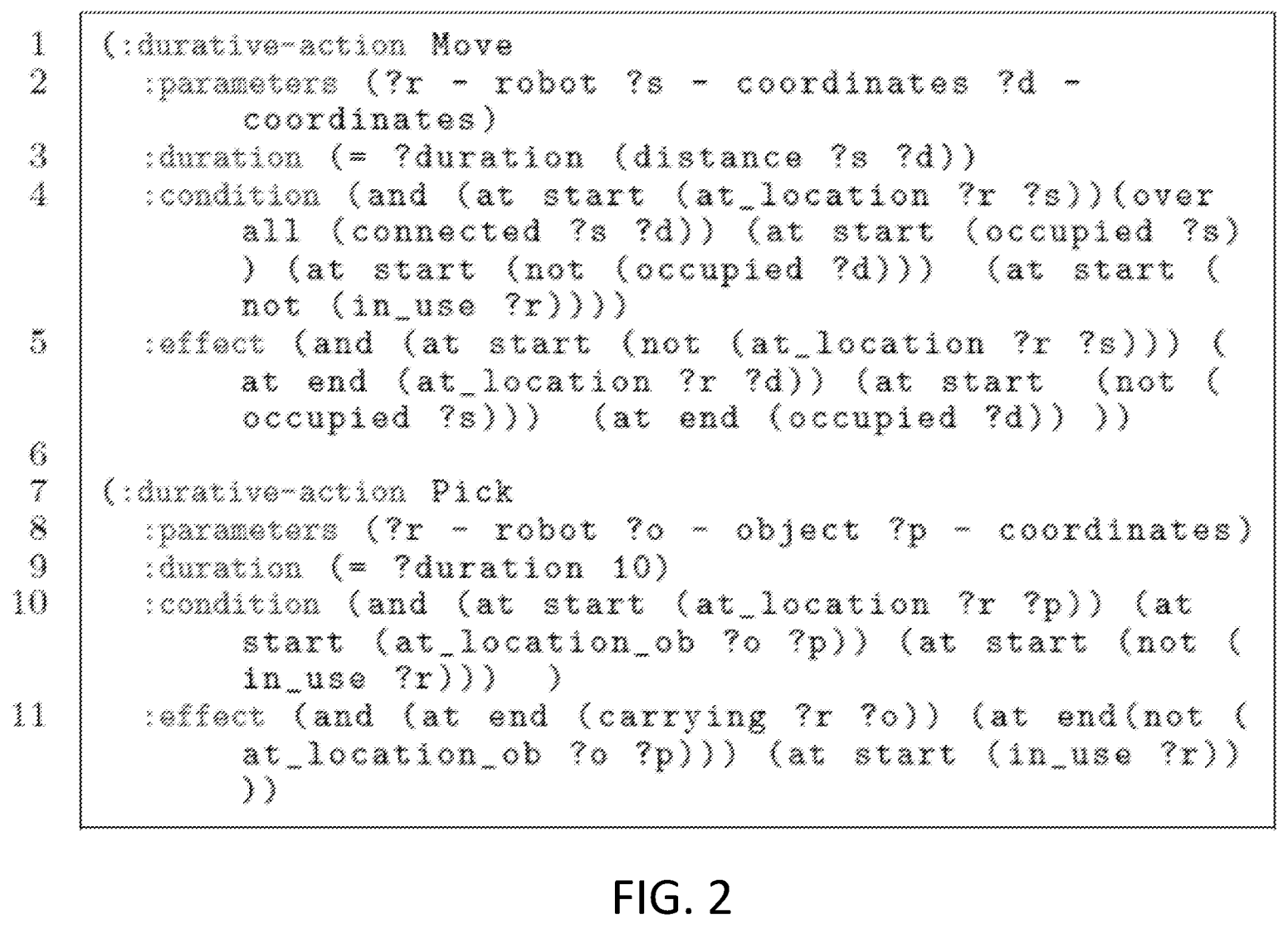

```
1  (:durative-action Move
2    :parameters (?r - robot ?s - coordinates ?d -
          coordinates)
3    :duration (= ?duration (distance ?s ?d))
4    :condition (and (at start (at_location ?r ?s))(over
          all (connected ?s ?d)) (at start (occupied ?s)
          ) (at start (not (occupied ?d))) (at start (
          not (in_use ?r))))
5    :effect (and (at start (not (at_location ?r ?s))) (
          at end (at_location ?r ?d)) (at start (not (
          occupied ?s))) (at end (occupied ?d)) ))

6  (:durative-action Pick
7    :parameters (?r - robot ?o - object ?p - coordinates)
8    :duration (= ?duration 10)
9    :condition (and (at start (at_location ?r ?p)) (at
          start (at_location_ob ?o ?p)) (at start (not (
          in_use ?r))) )
10   :effect (and (at end (carrying ?r ?o)) (at end(not (
          at_location_ob ?o ?p))) (at start (in_use ?r))
          ))
```

FIG. 2

*Definition 8:* Timed Plan Execution A timed plan $\pi$ for a planning problem $P$ is executable if it defines a sequence of time-stamps and actions $t_i : a_i$, ($i = 0, \ldots, k$) such that there is a sequence of observed states $s_i$, ($i = 0, \ldots, k+1$), where $s_0$ is the initial state and $iA$ pred $s_{i+1}, S_i$ is the resulting state of execution happening at time-stamp $t_i$ in problem $P$.

*Definition 9:* Timed Automata A timed automata is a tuple $(L, L^0, C, A, E, I)$:
- $L$ is a set of locations, $L^0 \in L$ is the initial location
- $C$ is the set of clocks
- $A$ is the set of actions (including internal actions)
- $E \subseteq L \times A \times B(C) \times 2^C \times L$ is a set of edges between locations with an action, a guard and a set of clocks to be reset
- $I : L \mapsto B(C)$ is the set of invariants at locations

*Definition 11:* Timed Game Automata A timed game automata (TGA) is a timed automata such that $A = A_c \cup A_u$ partitioned into controllable ($A_c$) and uncontrollable ($A_u$) actions.

FIG. 9

1) `set_clock()` Each robot is provided an individual clock $c$ (initialized to 0), an initial urgent location $L_0$ and a final goal location $L_g$.
2) `set_states()` Each planned task step $T_1, \ldots, T_k$ is reduced to an intermediary location state between the start and goal state. These states are labeled $L_1, \ldots, L_k$ appropriate to the task action labels.

3) `set_edges()` The sequence of temporal planned steps map to edge transitions $E_1, \ldots, E_{k+1}$ leading from the initial to the goal states. Formally, the edge $E_i$ is a tuple $(L_{i-1}, c_g, L_i)$, with the transition from location $L_{i-1}$ to $L_i$ provided with the guard $c_g$ for $i \in (1, \ldots, k)$. These may be controllable or uncontrollable (further discussed in Section VIII).
4) `set_edge_guards() set_state_guards()` Clock constraints are added based on the durations of the task $D_1 \ldots D_k$. Each location $L_i$ contains and invariant $c_g \leq D_i$ while each transition out of the state $(E_i)$ has the guard $c_g \geq D_i$ for $i \in (1, \ldots, k)$. The goal location has no output transition or clock constraints. These clock constraints ensure that the transitions are enabled at the exact times specified in the temporal plan.

Note that no channels are used for coordination between synchronous actions – the timing constraints included in clocks $x$ and $y$ are to be followed to ensure temporal ordering of actions.

FIG. 10

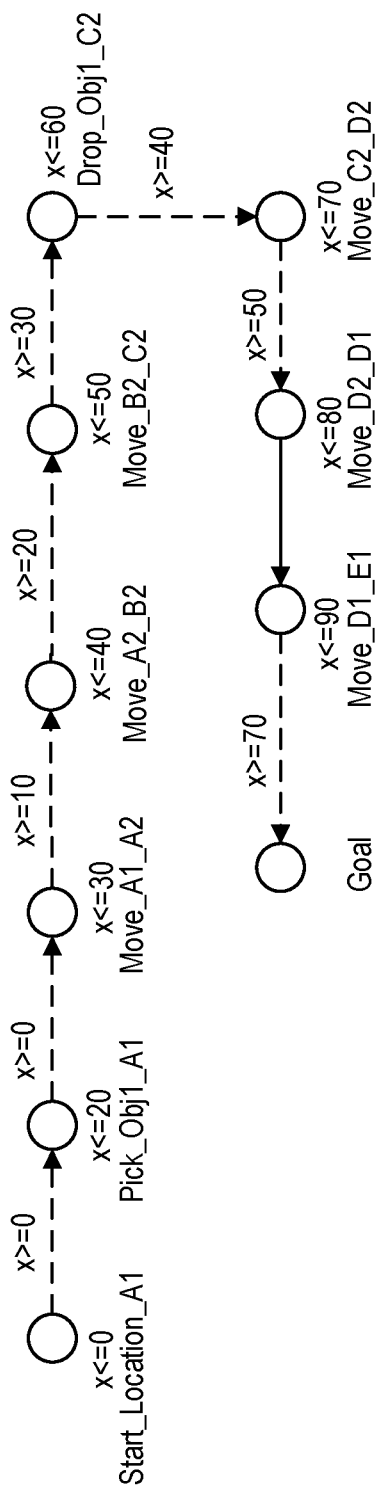
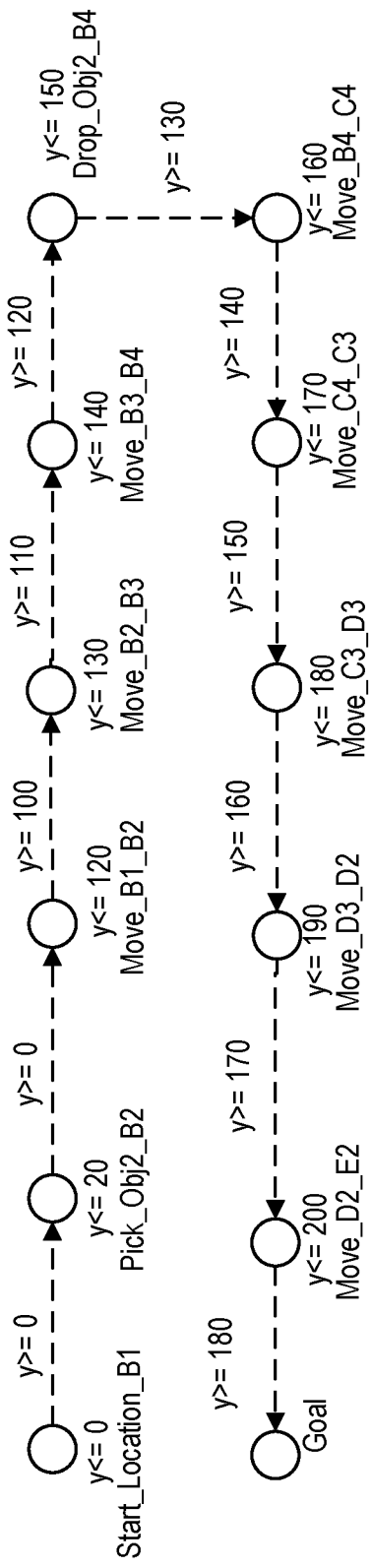
FIG. 12(a) Robot 1 with Uncontrollable Transitions
FIG. 12(b) Human 2 with Uncontrollable Transitions Robot 3 with Partially Controllable Transitions Robot 4 with Partially Controllable Transitions

```
control: A[not((( Human2.Drop_Obj2_B4) and (
    Robot3.Pick_Obj2_B4)) or (Robot1.Drop_Obj1_C2
    and Robot4.Pick_Obj1_C2) or ((Robot4.Move_D6_E6)
    and (Robot3.Drop_Obj2_E6)) ) U (Robot1.Goal and
    Human2.Goal and Robot3.Goal and Robot4.Goal)]
```

FIG. 13

```
1  Strategy to win:
2
3  State: ( Robot1.Goal    Human2.Move_D3_D2
      Robot3.Pick_Obj2_B4 Robot4.Move_E5_D5 )
4  When you are in ( Human2.y==170 &&  Human2.y==Robot3.z
      && Robot3.z==Robot4.m && Robot4.m==170), take
      transition Robot3.Pick_Obj2_B4-
      >Robot3.Move_B4_B5 { z >= 170, tau, 1 }
5  ...
6  State: ( Robot1.Goal    Human2.Move_C4_C3
      Robot3.Move_B5_B4 Robot4.Drop_Obj1_E5 )
8  When you are in ( Human2.y==160 &&  Human2.y==Robot3.z
      && Robot3.z==Robot4.m && Robot4.m==160), take
      transition Robot3.Move_B5_B4-
      >Robot3.Pick_Obj2_B4 { z >= 160, tau, 1 }
```

FIG. 14

```
1  Feedback received: robot_moved:
2  "robot moved location - 1 timestamp: 12:45:53 ---
        time bounds exceeded"
3  Feedback received: robot_moved:
4  "robot moved location - 2 timestamp: 12:46:16 ---
        completed within time bounds"
5  Feedback received: waiting_robot:
6  "Robot Waiting Time Units 7 timestamp: 12:47:12"
```

FIG. 16

Algorithm 1: Generating Optimal Control Zones.

1 Input: Timed game automata $\mathcal{G}$ with control property $\mathcal{P} = \mathbf{A}(\phi^S, \phi^\lambda) \mathbf{U} \phi_g$ to be verified until goal condition
2 Output: $\phi^{\lambda_c}$ the set of observable controllable actions; $\phi^{\lambda_c}$ the set of observable uncontrollable actions
3 Initialize controllable actions $\phi^{\lambda_c} \leftarrow \emptyset$ in $\mathcal{G}$;
4 Initialize uncontrollable actions $\phi^{\lambda_u} \leftarrow \phi^\lambda$ in $\mathcal{G}$;
5 for *each state $\phi^S$ in property $\mathbf{A}(\phi^S, \phi^\lambda) \mathbf{U} \phi_g$* do
6     Change every incoming and outgoing transition of $\phi^S$ to controllable $\phi^{\lambda_c}$;
7     Evaluate winning strategy in UPPAAL-TIGA over the timed game automata $\mathcal{G}$;
8     if *winning strategy in UPPAAL-TIGA maps correctly to $\mathcal{P} = \mathbf{A}(\phi^S, \phi^\lambda) \mathbf{U} \phi_g$* then
9         Return the optimal control zones;
10         stop;
11     else
12         while *winning strategy in UPPAAL-TIGA is not found* do
13             Change every incoming and outgoing transitions to current controllable zone $\phi^{\lambda_c}$;
14             Evaluate $\mathcal{P} = \mathbf{A}(\phi^S, \phi^\lambda) \mathbf{U} \phi_g$ over current controllable zones;

FIG. 19

SYSTEMS AND METHODS FOR TIMED PLAN VERIFICATION AND STRATEGY SYNTHESIS FOR MULTI-ROBOT COORDINATION

CROSS-REFERENCE TO RELATED APPLICATIONS

This application is a Submission Under 35 U.S.C. § 371 for U.S. National Stage Patent Application of International Application Number: PCT/IN2020/051064, filed Dec. 29, 2020 entitled "SYSTEMS AND METHODS FOR TIMED PLAN VERIFICATION AND STRATEGY SYNTHESIS FOR MULTI-ROBOT COORDINATION," the entirety of which is incorporated herein by reference.

TECHNICAL FIELD

Automation systems and in particular, a method and system for timed plan verification and strategy synthesis for multi-robot coordination.

BACKGROUND

Automation based warehouses/factories such that those that implement automation software, e.g., Industry 4.0 warehouse and factories, may use multiple robots to increase efficiency in operations. These robots may have to coordinate both among themselves as well as human participants in order to complete tasks. Large warehouse operators are already making use of both picker-to-parts and parts-to-picker robots along with human workers, referred to as cobots. Picker-to-parts systems include autonomous robots that move to the shelves to pick the ordered objects. For example, autonomous robots are attached to units in bins where these robots autonomously follow picking agents. This may be augmented with part-to-picker robotics system, which include robots to move the shelves to picking stations. In such systems, it is necessary to ensure safety while trying to achieve the best efficiency in terms of time to complete the assigned tasks.

Some automated systems with purely robotic subsystems (i.e., no humans) are based on artificial intelligence (AI) planning. In these systems, timed plans (timed sequence of robot actions) are designed or automatically synthesized to accomplish a task while facilitating the coordination among robots. Then, a dispatcher unit dispatches the timed actions to the respective robots which are expected to complete the actions within estimated duration.

However, a shortcoming of these planning-based systems is that uncertainties arising from jitter (i.e., time deviations) in the time required for the robots to complete an action can result in unsafe system states. This situation is aggravated in collaborative workspaces because of the possibility of injury to the human collaborators by the robot. In order to ensure safety, plans can be designed to have large tolerances in dispatch times. However, this can greatly increase the makespan (time to complete the task) which is likely not be acceptable in real world warehouses and factories.

In particular, existing system may suffer from one or more of the following:
  Safety in robotics when deployed in proximity of humans is typically performed via onboard sensors or visual mapping. However, this produces interruptions and sudden deviations from task plans/timed plans, that might cause operation stoppages/deadlocks or require manual interventions.
  Humans can be modeled as robotic subsystems and plans may be generated for human collaborators along with the robotic subsystems. However, while the humans can perform fairly intricate operations, one expects a degree of uncertainty in the timings of these human based operations. Plans which do not take such uncertainties into account may fail when getting executed and may need frequent replanning. In the cobots scenarios, such failures and constant replanning can be extremely unproductive considering the fact that human operators are likely not amenable to "reset" type of operations. Further, system owners can lose trust in the system's ability to be flexible which may lead to slower adaptation of autonomous systems.
  While research has been performed to verify Robot Operating System (ROS) robot deployments for safety, extending it to multiple agents with uncontrollable events is not performed.
  One possible approach to handle cobots use cases is where uncertainties at plan time are modeled in detail and plans are synthesized accordingly. This may allow optimal plans to be generated within the boundaries of the uncertainties. However, the downside of this approach is that often the modeling cannot capture all the details of uncertainties and the details in the model leads to large computation time during plan synthesis.

SUMMARY

Some embodiments advantageously provide a method and system for timed (i.e., temporal) plan verification and strategy synthesis for multi-robot coordination.

Therefore, in a planning-based collaborative (cobot+humans) system, plans should be synthesized and dispatched intelligently so that, in spite of jitters in action duration, the system achieves the minimum makespan possible while ensuring that the system never enters an unsafe state.

In one or more embodiments, the model used for plan synthesis is kept at a low complexity so that synthesis takes less amount of time. The handling of uncertainties (e.g., time deviations) is pushed to the dispatch function which handles the uncertainties during run-time thereby avoiding the assumptions of worst-case uncertainties that are made in existing systems. The dispatch function is based on an adaptive controller and/or node which derives plans using formal methods techniques, as described herein.

In one or more embodiments, given timed plans for a plurality of robots and humans and a bound on timing uncertainties (e.g., jitter), a minimal dispatch module is provided that helps ensure safety while ensuring minimum deviation from the original makespan. In one or more embodiments, the design follows the following steps:
  1. Translation of the timed plans to timed-game automata (TIGA)—the input format of a UPPAAL-TIGA tool—integrating constructs for the timing uncertainties.
  2. Use UPPAAL-TIGA to verify and identify, pre-execution, the possibility of violation of safety properties.
  3. Use UPPAAL-TIGA to synthesize a strategy when the safety properties are violated where the strategy ensures any uncertainty in human/cobot operations are still satisfied through minor waiting periods.
  4. Generating a dispatcher module with control rules for initiating actions derived from the strategy which is output by UPPAAL-TIGA.
  5. Optimizing the control rules in the dispatcher module without sacrificing safety such that the dispatcher module/controller may help ensure correct execution of timed plans despite timing deviations. The dispatcher module may be implemented by dispatcher device.

This helps ensure verification properties are satisfied during plan execution by cobots, despite uncertainty in human participant actions or temporal execution deviations.

Therefore, one or more embodiments of the present disclosure provide one or more of the following advantages:

Analysis of temporal variations in planned actions, that can lead to significant drift in end-to-end plan times, which can lead to deadlocks or unsafe operating states.

Transforming temporal plan outputs to timed game automata and using UPPAAL-TIGA to analyze one or more properties such as safety or safety properties/rules.

Strategies to repair/modify timed plans that do not meet safety properties/rules on the fly, including one or more of adding delays to action start points (i.e., robot action start points), milestones or plan execution reordering, etc. This is performed without adding additional planning complexity or heavy formal analysis before execution.

Analysis of controllable zones in plan execution and providing a model of minimal controllable actions needed to generate winning strategies for generating a TIGA controller strategy.

According to one aspect of the disclosure, a node for temporal plan verification and timed game automata, TIGA, controller strategy synthesis for coordination of a plurality of agents is provided. The node includes processing circuitry configured to determine a first model of a plurality of temporal plans for timed operations of the plurality of agents violates at least one predefined safety rule, and generate the TIGA controller strategy for controlling the timed operations of at least a subset of the plurality of agents where the TIGA controller strategy meets the at least one predefined safety rule and being based on the first model. The processing circuitry is further configured to cause transmission of the TIGA controller strategy to a dispatch device for translating the TIGA controller strategy to instructions for the plurality of agents.

According to one or more embodiments, the first model of the plurality of temporal plans is a TIGA model. According to one or more embodiments, the TIGA model includes added timing deviations to the timed operations of the plurality of agents. According to one or more embodiments, the TIGA controller strategy for controlling the timed operations of at least the subset of the plurality of agents is configured to modify at least one temporal plan by at least one of adding a time delay and adding a time constraint.

According to one or more embodiments, the processing circuitry is further configured to perform one-to-one mapping of one of sequential and partially ordered temporal tasks, in each of the plurality of temporal plans, to transitions in a respective TIGA model based at least on a plurality of transformation rules, and modify at least one of the respective TIGA models by at least one time unit to create at least one temporal overlap between two respective TIGA models. The generating of the TIGA controller strategy is based on the one-to-one mapping and that at least one of the respective TIGA models that was modified. According to one or more embodiments, the TIGA controller strategy is configured to prevent occurrences of deadlocks among the plurality of agents based at least on the at least one safety rule. According to one or more embodiments, the processing circuitry is further configured to initialize all states in the at least one TIGA model to be uncontrollable states, and iteratively change a number of controlled states in the at least one TIGA model to determine at least one of a minimum number of control zones and at least one control zone size that satisfy the at least one safety rule. The at least one of a minimum number of control zones and at least one control zone size corresponds to a minimum number of control rules for the at least one TIGA model to satisfy the at least one safety rule.

According to one or more embodiments, each control rule includes at least one of at least one rule for transitioning at least one of into and out of a state, and at least one clock value. According to one or more embodiments, the plurality of agents includes at least one automated device and at least one human. According to one or more embodiments, the processing circuitry is further configured to receive a time deviation estimate that is based on monitoring of at least one of the plurality of agents where the TIGA controller strategy is based at least in part on the time deviation estimate.

According to another aspect of the disclosure, a method implemented by a node for temporal plan verification and timed game automata, TIGA, controller strategy synthesis for coordination of a plurality of agents is provided. A first model of a plurality of temporal plans for timed operations of the plurality of agents is determined to violate at least one predefined safety rule. The TIGA controller strategy for controlling the timed operations of at least a subset of the plurality of agents is generated. Where the TIGA controller strategy meets the at least one predefined safety rule and being based on the first model. Transmission is caused of the TIGA controller strategy to a dispatch device for translating the TIGA controller strategy to instructions for the plurality of agents.

According to one or more embodiments, the first model of the plurality of temporal plans is a TIGA model. According to one or more embodiments, the TIGA model includes added timing deviations to the timed operations of the plurality of agents. According to one or more embodiments, the TIGA controller strategy for controlling the timed operations of at least the subset of the plurality of agents is configured to modify at least one temporal plan by at least one of adding time delay and adding a time constraint.

According to one or more embodiments, one-to-one mapping of one of sequential and partially ordered temporal tasks, in each of the plurality of temporal plans, to transitions in a respective TIGA model is performed based at least on a plurality of transformation rules. At least one of the respective TIGA models is modified by at least one time unit to create at least one temporal overlap between two respective TIGA models. The generating of the TIGA controller strategy is based on the one-to-one mapping and that at least one of the respective TIGA models that was modified. According to one or more embodiments, the controller strategy is configured to prevent occurrences of deadlocks among the plurality of agents based at least on the at least one safety rule. According to one or more embodiments, all states in the at least one TIGA model are initialized to be uncontrollable states. A number of controlled states in the at least one TIGA model is iteratively changed to determine at least one of a minimum number of control zones and at least one control zone size that satisfy the at least one safety rule. The at least one of a minimum number of control zones and at least one control zone size correspond to a minimum number of control rules for the at least one TIGA model to satisfy the at least one safety rule.

According to one or more embodiments, each control rule includes at least one of at least one rule for transitioning at least one of into and out of a state, and at least one clock value. According to one or more embodiments, the plurality of agents includes at least one automated device and at least one human. According to one or more embodiments, a time deviation estimate that is based on monitoring of at least one of the plurality of agents is received where the TIGA controller strategy is based at least in part on the time deviation estimate.

According to another aspect of the disclosure, a dispatcher device for implementing a timed game automata, TIGA, controller strategy for coordination of a plurality of agents is provided. The dispatcher device includes processing circuitry configured to receive the TIGA controller strategy for the plurality of agents, and transform the TIGA controller strategy to first instructions for the plurality of agents where the first instructions are configured to modify at least one of a plurality of temporal plans for timed operations of the plurality of agents in order to satisfy at least one safety rule. The processing circuitry is further configured to cause signaling of the first instructions to the plurality of agents.

According to one or more embodiments, the processing circuitry is further configured to receive information of time deviations from at least one of the plurality of agents, cause transmission of the information of time deviations, and receive a modified TIGA controller strategy that is based on the information of time deviations. The processing circuitry is further configured to transform the modified TIGA controller strategy to second instructions for the plurality of agents, and cause signaling of the second instructions to the plurality of agents. According to one or more embodiments, the TIGA controller strategy is configured to modify the at least one of a plurality of temporal plans by at least one of adding a time delay and adding a time constant. According to one or more embodiments, the TIGA controller strategy is configured to prevent occurrences of deadlocks among the plurality of agents based at least on the at least one safety rule. According to one or more embodiments, the plurality of agents are a plurality of automated devices.

According to another aspect of the disclosure, a method implemented by a dispatcher device for implementing a timed game automata, TIGA, controller strategy for coordination of a plurality of agents is provided. The TIGA controller strategy for the plurality of agents is received. The TIGA controller strategy is transformed to first instructions for the plurality of agents where the first instructions are configured to modify at least one of a plurality of temporal plans for timed operations of the plurality of agents in order to satisfy at least one safety rule. Signaling is caused of the first instructions to the plurality of agents.

According to one or more embodiments, information of time deviations from at least one of the plurality of agents is received. Transmission is caused of the information of time deviations. A modified TIGA controller strategy that is based on the information of time deviations is received. The modified TIGA controller strategy is transformed to second instructions for the plurality of agents. Signaling is caused of the second instructions to the plurality of agents. According to one or more embodiments, the TIGA controller strategy is configured to modify the at least one of a plurality of temporal plans by at least one of adding a time delay and adding a time constant.

According to one or more embodiments, the TIGA controller strategy is configured to prevent occurrences of deadlocks among the plurality of agents based at least on the at least one safety rule. According to one or more embodiments, the plurality of agents are a plurality of automated devices.

According to another aspect of the disclosure, a computer program product for temporal plan verification and timed game automata, TIGA, controller strategy synthesis for coordination of a plurality of agents is provided. The computer program product includes computer readable program code that, when executed by a processor, causes the computer program product to perform the method(s) described herein.

According to another aspect of the disclosure, A computer program product for implementing a timed game automata, TIGA, controller strategy for coordination of a plurality of agents the computer program product includes computer readable program code that, when executed by a processor, causes the computer program product to perform the method(s) described herein.

According to another aspect of the disclosure, a computer program for temporal plan verification and timed game automata, TIGA, controller strategy synthesis for coordination of a plurality of agents is provided. The computer program, when executed by a processor, performing the method(s) described herein.

According to another aspect of the disclosure, a computer program for implementing a timed game automata, TIGA, controller strategy for coordination of a plurality of agents is provided. The computer program, when executed by a processor, performing the method(s) described herein.

According to another aspect of the disclosure, a computer readable medium for temporal plan verification and timed game automata, TIGA, controller strategy synthesis for coordination of a plurality of agents is provided. The computer readable medium includes instructions, when executed by a processor, cause the processor to perform the method(s) described herein.

According to another aspect of the disclosure, a computer readable medium for implementing a timed game automata, TIGA, controller strategy for coordination of a plurality of agents is provided. The computer program, when executed by a processor, cause the processor to perform the method(s) described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 2 is a diagram of a subset of a Planning Domain Definition Language (PDDL) action description;

FIG. 9 is a diagram of time game automata model according to the principles in the present disclosure;

FIG. 10 is a diagram of time game automata transformation rules according to the principles in the present disclosure;

FIGS. 12(a), 12(b), 12(c) and 12(d) are diagrams of a time game automata model for multi-robot coordination with temporal drifts according to the principles in the present disclosure;

FIG. 13 is a diagram of an objective for generating a controller strategy according to the principles in the present disclosure;

FIG. 14 is a diagram of some control properties for generating a controller strategy according to the principles in the present disclosure;

FIG. 16 is a diagram of a portion of a timed plan that has triggered an additional wait time according to the principles in the present disclosure;

FIG. 19 is an algorithm for an iterative approach for generating a minimal number of controllable transition according to the principles in the present disclosure;

DETAILED DESCRIPTION

Figure 1:
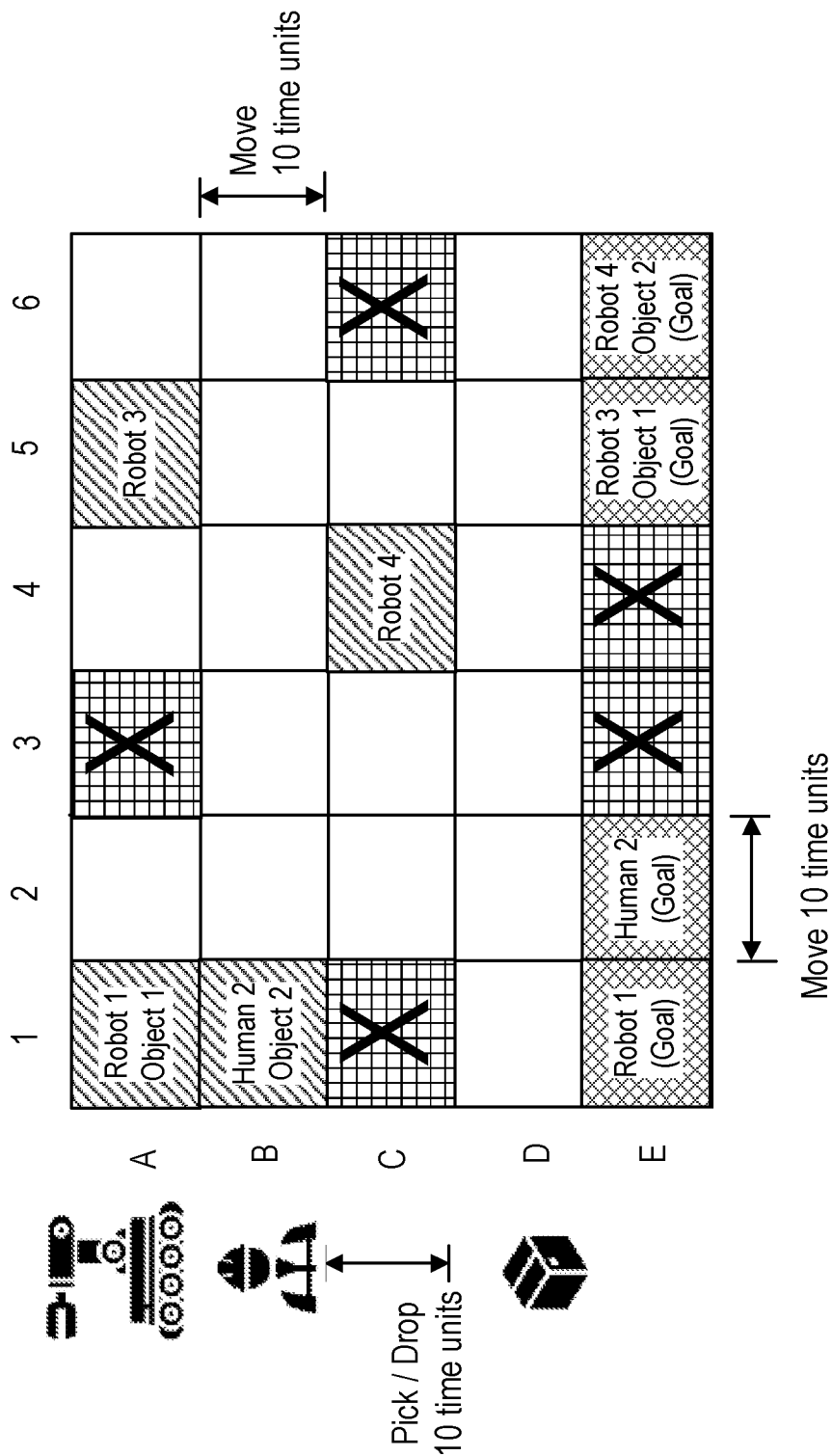
FIG. 1 is a diagram of a warehouse cobot coordination scenario.

One or more embodiments described herein relate to the following details:

Warehouse scenario where cobots (i.e., agents/robots) and humans interact to execute a task according to one or more time/temporal plans. Deviations in temporal actions in one or more timed plans are introduced to demonstrate unsafe states and deadlocks.

Transforming timed plans into timed game automata (TIGA) for verification and analysis.

Synthesis of strategies to help ensure properties (e.g., safety properties/rules) are met despite the introduction of deviations (e.g., time deviations, jitter, etc.), and analysis of timing behavior;

Synthesis of controllable zones ensuring optimal number of dispatch rules such a minimal number of rules needed to satisfy at least one safety rule or property.

Reference is made herein to the drawing figures in which like reference designators refer to like elements.

Scenario—Cobot Interaction

A multi-robot and human coordination example is provided according to the diagram of FIG. 1, that may be typically seen in warehouse logistics. Robot 1 (initial position A1) and Human 2 (initial position B1) must pick objects from their initial positions and drop them off midway. Robot 1 and Robot 2 then make their way to final goal positions of E1 and E2, respectively. The dropped objects are collected by Robot 3 (initial position A5) and Robot 4 (initial position C4) to drop them off at goal locations of Object 1 (goal position E5) and Object 2 (goal position E6). The values provided in FIG. 1 represent the time units to complete movement tasks (this can be expanded with distances, robot speed, etc.). No two robots or humans may be at the same grid position simultaneously. This represents a task typically observed in warehouse logistics, wherein human and robotic participants coordinate to complete the task.

In one or more embodiments, one or more of the following assumptions may be made:

Every robotic agent and human worker execute their individual timed plan and maintains logs of deviations from the respective timed plans. Prior to starting/stopping a next task, the robot checks with the dispatching device that dispatches plans. The human tries to keep up with the plan with minimal deviations.

Robots do not take any plan deviating actions independently without consulting the dispatching device.

The human participants are treated as uncontrollable actors such that the planning must be performed despite this factor.

The robots and humans do not communicate with each other and the only timing constraints are those provided to individual robots/humans that must be satisfied.

The plan helps maximize concurrent actions among robots and humans to help minimize end-to-end execution times.

If any of the robots or humans reach a grid location before/after planned times, deadlocks/livelocks may occur where the robot/human may have to wait for another robot/human to finish its tasks before the waiting robot or human can proceed. Deadlocks/livelocks should try to be avoided by carefully controlling dispatch of actions available via the plan dispatcher. Deviations on the part of robots can also pose safety hazards to humans and should be avoided.

Temporal Plan Deviation and Deadlocks

In order to plan and schedule individual actions one or more cobots, one or more embodiments described herein uses Planning Domain Definition Language (PDDL) version 2.1, for example, to generate optimal plans via Artificial Intelligence (AI) planning. A subset of the PDDL 2.1 action description, pre-conditions, post-conditions and timing constraints for the multi-robot coordination problem are illustrated in FIG. 2 and described below.

Given the above predicates in the PDDL 2.1 domain model, the problem is instantiated with initial conditions, goals and objective metric. This may be solved via AI planning solvers to extract individual human and cobot plans. An example is provided below. Note that parallel movement of all cobots and humans are allowed, with durations of atomic movement, pick and drop actions set at 10 time units. The plan is decomposed to generate individual temporal plans for Human 2 and Robot 3, that run concurrently. For example, in the first line for the plan for Human 2: "0.0000" represents a time stamp, "(PICK HUMAN2 OBJECT2 B1)" represents an action, and "D:10.00" represents a time duration such as 10 time units and "C:0.10" represents a cost of 0.10. In one or more embodiments, the cost may be omitted as it may not be considered in the temporal plans.

Plan for HUMAN2:
  0.0000: (PICK HUMAN2 OBJECT2 B1) [D:10.00; C:0.10]

110.0000: (MOVE HUMAN2 B1 B2) [D:10.00; C:0.10]
120.0000: (MOVE HUMAN2 B2 B3) [D:10.00; C:0.10]
130.0000: (MOVE HUMAN2 B3 B4) [D:10.00; C:0.10]
140.0000: (DROP HUMAN2 OBJECT2 B4) [D:10.00; C:0.10]
150.0000: (MOVE HUMAN2 B4 C4) [D:10.00; C:0.10]
160.0000: (MOVE HUMAN2 C4 C3) [D:10.00; C:0.10]
170.0000: (MOVE HUMAN2 C3 D3) [D:10.00; C:0.10]
180.0000: (MOVE HUMAN2 D3 D2) [D:10.00; C:0.10]
190.0000: (MOVE HUMAN2 D2 E2) [D:10.00; C:0.10]
Plan for ROBOT3:
0.0000: (MOVE ROBOT3 A5 B5) [D:10.00; C:0.10]
160.0000: (MOVE ROBOT3 B5 B4) [D:10.00; C:0.10]
170.0000: (PICK ROBOT3 OBJECT2 B4) [D:10.00; C:0.10]
180.0000: (MOVE ROBOT3 B4 B5) [D:10.00; C:0.10]
190.0000: (MOVE ROBOT3 B5 C5) [D:10.00; C:0.10]
200.0000: (MOVE ROBOT3 C5 D5) [D:10.00; C:0.10]
210.0000: (MOVE ROBOT3 D5 D6) [D:10.00; C:0.10]
220.0000: (MOVE ROBOT3 D6 E6) [D:10.00; C:0.10]
230.0000: (DROP ROBOT3 OBJECT2 E6) [D:10.00; C:0.10]
240.0000: (MOVE ROBOT3 E6 E5) [D:10.00; C:0.10]
METRIC_VALUE=260.00
Solution number: 3
Total time: 9.20
Search time: 9.19
Actions: 61
Duration: 260.000
Total Num Flips: 5166

Figure 3:
FIG. 3 is a diagram of deadlock and unsafe conditions due to temporal deviations in a cobot coordination scenario.

Deadlock Occurrence Example: Once the individual agents' plans are generated, the warehouse controller dispatches the plans assuming the temporal specifications guarantee avoidance of unsafe situations. However, in real world situations, there are repeated instances where the execution of one or more plans deviate slightly from the intended plan timeline such as to lead to unintended outputs. An example is illustrated in FIG. 3 where a ±10 time unit deviation in each action results in multiple deadlocks in the cobot human example. This is especially probable with human participants who may get distracted or fatigued during plan execution. For example, looking at the interaction between Human 2 and Robot 3, Human 2 is scheduled to reach B4 at 140 time units but gets delayed. At 150, both Human 2 and Robot 3 attempt to get to B4, that results in a deadlock and/or unsafe condition. Therefore, in existing systems, the entire plan may have to be aborted in this case, which may cause significant delays and hazards. This is a pathological problem seen in multiple instances of FIG. 3.

Thus, it may be important to formally model and verify the deployed plans, to ensure that the executions occur in a safe manner, despite fluctuations in the intended timelines.

One or more embodiments of the instant disclosure advantageously helps solve one or problems with existing systems. In the following, one or more embodiments described herein are contrasted with some existing systems that relate to "uncontrollable" events at plan time. Table 1 describes some of the differences between existing system and the instant disclosure.

TABLE 1

| | Transformation into timed games | Safe control synthesis and dispatch to Cobots | Optimal controllable zones |
|---|---|---|---|
| Resolving Uncontrollable Conditional Temporal Problems using Continuous Relaxations | In some existing systems, modeling is performed using temporal networks with duration uncertainties [a, b] built in. The planning/synthesis is a central process making it complex/cumbersome. However, the present disclosure uses standard temporal plans and translates them into TGA. Uncertainties are incorporated post planning. It is also more flexible to observed deviations. | In some existing systems, a generic domain is considered. No notion of verification of safe control synthesis is described. The assumption is that following a certain timeline would lead to feasible executions. No controller dispatch is used. However, the present disclosure is stronger as it incorporates verification of synthesized executions. This helps confirm the absence of deadlocks. | In some existing systems, controllability refers to changing the temporal constraints per steps. Flexibility (dynamic control) is provided in some steps to aid in better solutions. This is a plan time rather than dispatch. However, there is no link to verification or dispatch. Also, the present disclosure provides features that are not otherwise provided in existing system such as analysis of what aspects of a task are controllable. This may be needed in cobot scenarios where humans and some robots may not be controlled. This is also dependent on the property to be verified. |
| Strong Temporal Planning with Uncontrollable Durations (STPUD) | In some existing systems, the STPUD algorithm works only at the planning side. Strong temporal plans are generated with resolutions of uncertainties in plan timelines due to uncontrollable actions. However, this is a | In some existing systems, verification aspects are not mentioned/covered. Dispatch is not covered as they only address plan time. The present disclosure incorporates model checking into the | In some existing systems, while uncontrollable events are considered, the focus is to add some relaxation conditions to generate a strong plan. There is no link to property verification or optimal dispatch. Also, the present |

TABLE 1-continued

| Transformation into timed games | Safe control synthesis and dispatch to Cobots | Optimal controllable zones |
| --- | --- | --- |
| complex process with temporal checking of all plan times to be incorporated. The present disclosure describes an on the fly approach that is faster, closer to observations and easier to implement. | framework in order to deal with unsafe/deadlock situations in cobot and other robotics scenarios. | disclosure provides for optimal controllable zones that are towards the dispatch side where minimizing the number of controllable actions improves the controller complexity. This is also dependent on the property to be verified. |

Before describing in detail exemplary embodiments, it is noted that the embodiments reside primarily in combinations of apparatus components and processing steps related to time plan verification and strategy synthesis for at least multi-robot coordination.

Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "node" used herein can be any kind of network node comprised in a radio network which may further comprise any of server in an network or a base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc.

In some embodiments, the non-limiting terms agent may be a wired and/or wireless device. The wireless device herein can be any type of wireless device capable of communicating with a dispatch device and/or node. The wireless device may also be an automated robot or device that is a capable of receiving dispatch and performing one or more actions based on the dispatch or timed plans.

Note further, that functions described herein as being performed by a dispatch device or a node may be distributed over a plurality of dispatch devices and/or nodes. In other words, it is contemplated that the functions of the node and dispatch device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide time plan verification and strategy synthesis for at least multi-robot coordination.

Figure 4:
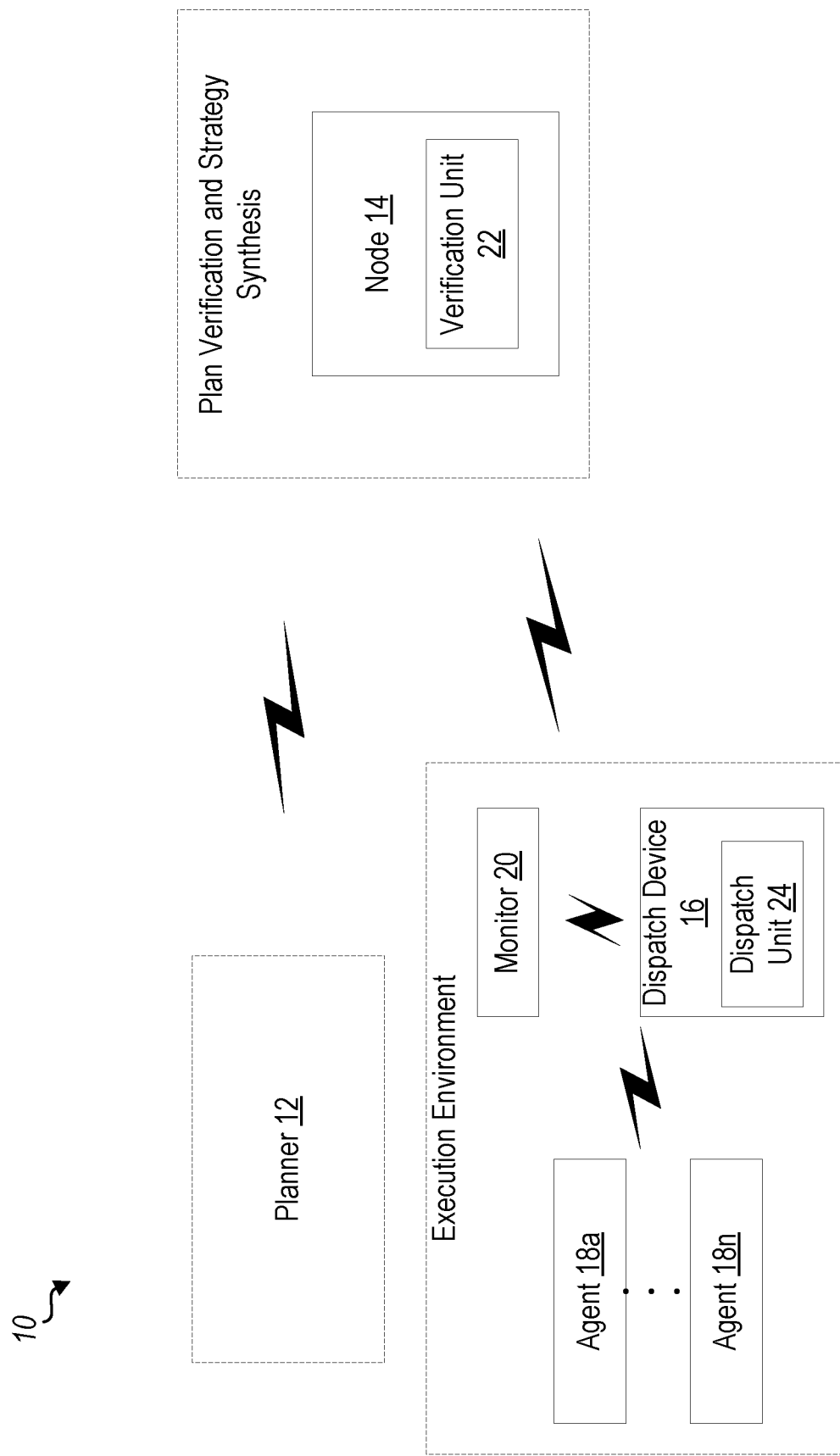
FIG. 4 is a schematic diagram of an example architecture illustrating a system according to the principles in the present disclosure.

There is shown in FIG. 4 a schematic diagram of a system 10 according to an embodiment. System 10 includes planner 12 (i.e., planner device) that is configured to communicate with node 14 via wireless and/or wired communication. In particular, planner 12 may be configured to determine temporal plans and decompose those plans into multi-agent plans as is known in the art. Node 14 is configured to perform plan verification and strategy synthesis as described herein. Node 14 is configured to communicate with one or more dispatch devices 16 (collectively referred to as dispatch device 16). Dispatch device 16 is configured to dispatch timing instructions/plans to one or more agents 18a-18n as described herein.

Agents 18a-18n (collectively referred to as agent 18) may include robots, automated robots and/or other devices in the execution environment as described herein. Agent 18 may communicate with dispatch device 16 via wireless and/or wired communication as is known in the art. The execution environment may further include one or more monitors 20 that are configured to monitor executions of agents 18 and provide updates to dispatch device 16. Monitor 20 may be in communication with agents 18 and/or dispatcher device 16 via wired and/or wireless communication.

A node 14 is configured to include a verification unit 22 which is configured to perform one or more node 14 functions as described herein such as with respect to plan verification and/or strategy synthesis as described herein. A dispatch device 16 is configured to include a dispatch unit 24 which is configured to perform one or more dispatch device 16 functions as described herein such as with respect to dispatching instructions/plans to one or more agents, as described herein.

Example implementations, in accordance with an embodiment, of the node 14, dispatch device 16 and agent 18 discussed in the preceding paragraphs will now be described with reference to FIG. 5.

System 10 includes node 14 that includes hardware 26 enabling it to perform one or more functions described herein and enabling it to communicate with planner 12 and dispatch device 16. The hardware 26 may include a communication interface 28 for setting up and maintaining a wired or wireless connection with an interface of a different entity of the system 10. The communication interface 28 may be formed as or may include, for example, one or more RF transmitters, one or more RF receivers, and/or one or more RF transceivers.

In the embodiment shown, the hardware 26 of the node 14 further includes processing circuitry 30. The processing circuitry 30 may include a processor 32 and a memory 34. In particular, in addition to or instead of a processor, such as a central processing unit, and memory, the processing circuitry 30 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 32 may be configured to access (e.g., write to and/or read from) the memory 34, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the node 14 further has software 36 stored internally in, for example, memory 34, or stored in external memory (e.g., database, storage array, network storage device, etc.) accessible by the node 14 via an external connection. The software 36 may be executable by the processing circuitry 30. The processing circuitry 30 may be configured to control any of the methods and/or processes described herein and/or to cause such methods, and/or processes to be performed, e.g., by node 14. Processor 32 corresponds to one or more processors 32 for performing node 14 functions described herein. The memory 34 is configured to store data, programmatic software code and/or other information described herein. In some embodiments, the software 36 may include instructions that, when executed by the processor 32 and/or processing circuitry 30, causes the processor 32 and/or processing circuitry 30 to perform the processes described herein with respect to node 14. For example, processing circuitry 30 of the node 14 may include verification unit 22 which is configured to perform one or more node 14 functions as described herein such as with respect to plan verification and/or strategy synthesis as described herein.

The system 10 further includes the dispatch device 16 already referred to. The dispatch device 16 may have hardware 38 that may include a communication interface 40 configured to set up and maintain a wired and/or wireless connection with one or more entities in system 10 such as with node 14, monitor 20, etc. The communication interface 40 may be formed as or may include, for example, one or more RF transmitters, one or more RF receivers, and/or one or more RF transceivers.

The hardware 38 of the dispatch device 16 further includes processing circuitry 42. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the dispatch device 16 may further comprise software 48, which is stored in, for example, memory 46 at the dispatch device 16, or stored in external memory (e.g., database, storage array, network storage device, etc.) accessible by the dispatch device 16. The software 48 may be executable by the processing circuitry 42. The processing circuitry 42 may be configured to control any of the methods and/or processes described herein and/or to cause such methods, and/or processes to be performed, e.g., by dispatch device 16. The processor 44 corresponds to one or more processors 44 for performing dispatch device 16 functions described herein. The dispatch device 16 includes memory 46 that is configured to store data, programmatic software code and/or other information described herein. In some embodiments, the software 48 may include instructions that, when executed by the processor 44 and/or processing circuitry 42, causes the processor 44 and/or processing circuitry 42 to perform the processes described herein with respect to dispatch device 16. For example, the processing circuitry 42 of the dispatch device 16 may include a dispatch unit 24 configured to perform one or more dispatch device 16 functions as described herein such as with respect to dispatching instructions/plans to one or more agents, as described herein.

Figure 5:
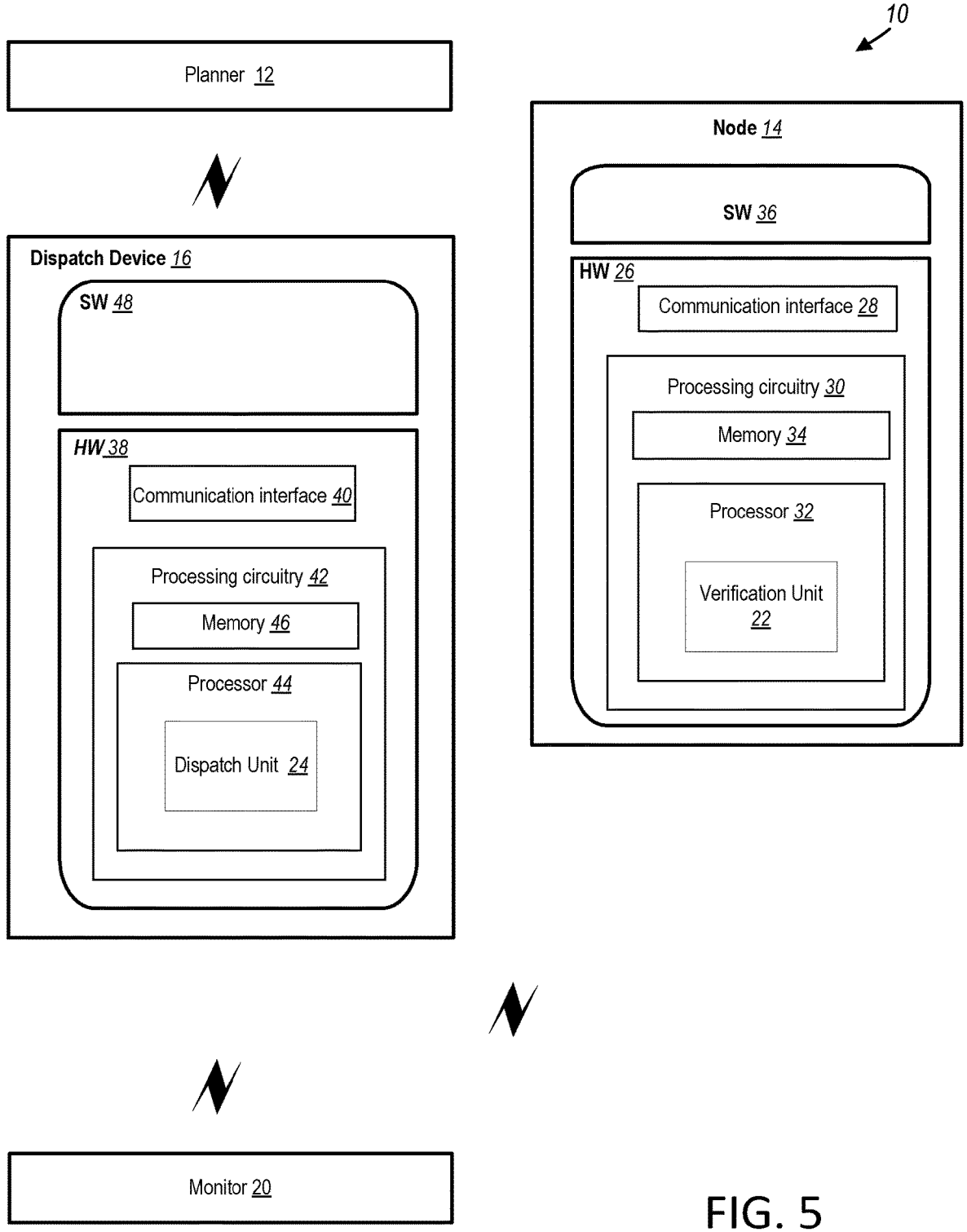
FIG. 5 is a block diagram of at least a portion of FIG. 1 according to the principles in the present disclosure.

In some embodiments, the inner workings of the node 14 and dispatch device 16 may be as shown in FIG. 5 and independently, the surrounding environment and/or topology may be that of FIG. 4.

Although FIGS. 4 and 5 show various "units" such as verification unit 22 and dispatch unit 24 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 6:
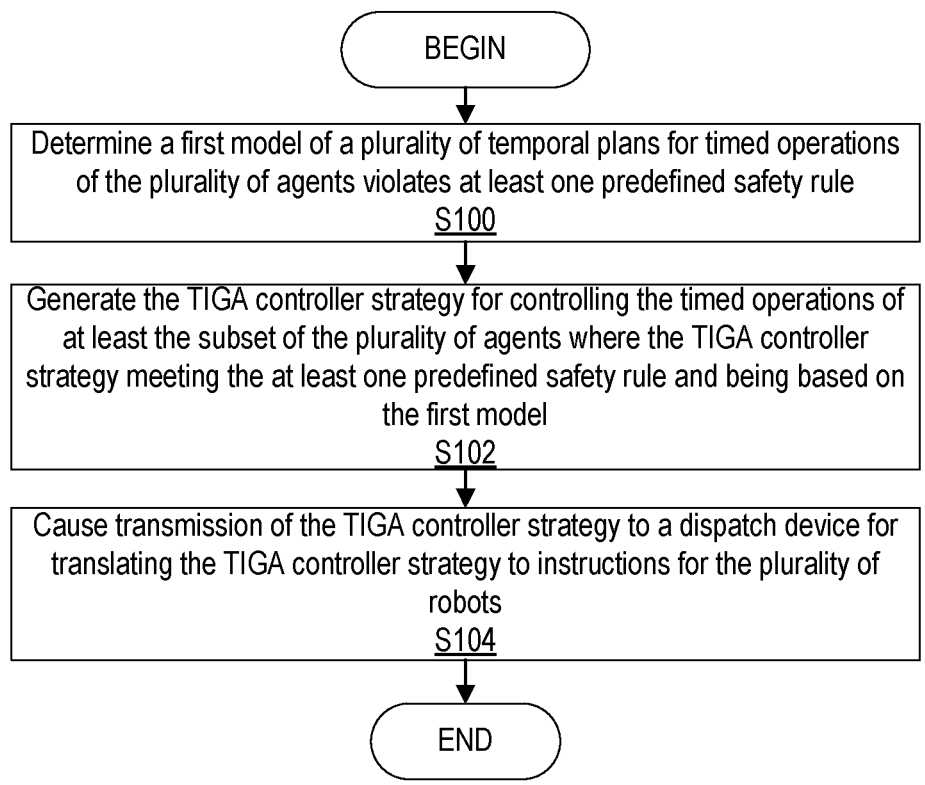
FIG. 6 is a flowchart of an example process in a node according to some embodiments of the present disclosure.

FIG. 6 is a flowchart of an example process in a node 14 for temporal plan verification and TIGA controller strategy synthesis for coordination of a plurality of agents 18 according to one or more embodiments. One or more Blocks and/or functions performed by node 14 may be performed by one or more elements of node 14 such as by verification unit 22 in processing circuitry 30, processor 32, communication interface 28, etc.

In one or more embodiments, node 14 such as via one or more of processing circuitry 30, processor 32, verification unit 22, and communication interface 28 is configured to determine (Block S100) a first model of a plurality of temporal plans for timed operations of the plurality of agents 18 violates at least one predefined safety property, as described herein. In one or more embodiments, node 14 such as via one or more of processing circuitry 30, processor 32, verification unit 22 and communication interface 28 is configured to generate (Block S102) the TIGA controller strategy for controlling the timed operations of at least the subset of the plurality of agents where the TIGA controller strategy meeting the at least one predefined safety rule and being based on the first model, as described herein. In one or more embodiments, node 14 such as via one or more of processing circuitry 30, processor 32, verification unit 22 and communication interface 28 is configured to cause transmission (Block S104) of the TIGA controller strategy to a dispatch device 16 for translating the TIGA controller strategy to instructions for the plurality of agents 18, as described herein.

According to one or more embodiments, the first model of the plurality of temporal plans is a TIGA model. According to one or more embodiments, the TIGA model includes added timing deviations to the timed operations of the plurality of agents. According to one or more embodiments, the TIGA controller strategy for controlling the timed operations of at least the subset of the plurality of agents is configured to modify at least one temporal plan by at least one of adding a time delay and adding a time constraint.

According to one or more embodiments, the processing circuitry is further configured to perform one-to-one mapping of one of sequential and partially ordered temporal tasks, in each of the plurality of temporal plans, to transitions in a respective TIGA model based at least on a plurality of transformation rules, and modify at least one of the respective TIGA models by at least one time unit to create at least one temporal overlap between two respective TIGA models. The generating of the TIGA controller strategy is based on the one-to-one mapping and that at least one of the respective TIGA models that was modified. According to one or more embodiments, the TIGA controller strategy is configured to prevent occurrences of deadlocks among the plurality of agents based at least on the at least one safety rule. According to one or more embodiments, the processing circuitry is further configured to initialize all states in the at least one TIGA model to be uncontrollable states, and iteratively change a number of controlled state in the at least one TIGA model to determine at least one of a minimum number of control zones and at least one control zone size that satisfy the at least one safety rule. The at least one of a minimum number of control zones and at least one control zone size corresponds to a minimum number of control rules for the at least one TIGA model to satisfy the at least one safety rule.

According to one or more embodiments, each control rule includes at least one of at least one rule for transitioning at least one of into and out of a state, and at least one clock value. According to one or more embodiments, the plurality of agents includes at least one automated device and at least one human. According to one or more embodiments, the processing circuitry is further configured to receive a time deviation estimate that is based on monitoring of at least one of the plurality of agents where the TIGA controller strategy is based at least in part on the time deviation estimate.

Figure 7:
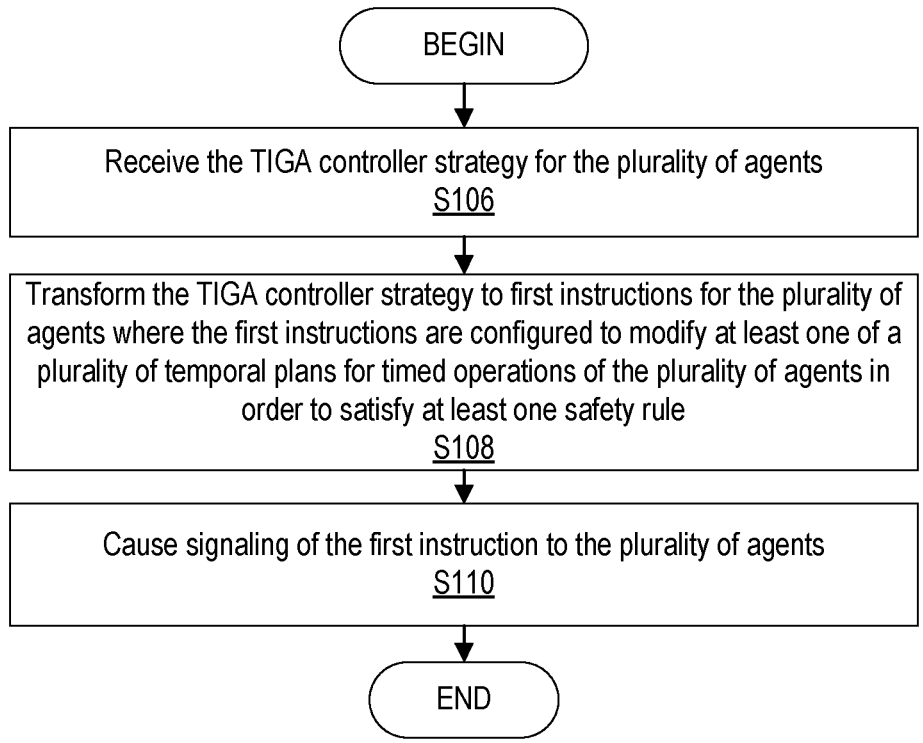
FIG. 7 is a flowchart of an example process in a dispatch device according to some embodiments of the present disclosure.

FIG. 7 is a flowchart of an exemplary process in a dispatcher device 16 for implementing the TIGA controller strategy for coordination of a plurality of agents 18 according to some embodiments of the present disclosure.

One or more Blocks and/or functions performed by dispatch device 16 may be performed by one or more elements of dispatch device 16 such as by dispatch unit 24 in processing circuitry 42, processor 44, communication interface 40, etc.

In one or more embodiments, dispatch device 16 such as via one or more of processing circuitry 42, processor 44, communication interface 40 is configured to receive (Block S106) the TIGA controller strategy for the plurality of agents 18, as described herein. In one or more embodiments, dispatch device 16 such as via one or more of processing circuitry 42, processor 44, communication interface 40 is configured to transform (Block S108) the TIGA controller strategy to first instructions for the plurality of agents 18 where the first instructions are configured to modify at least one of a plurality of temporal plans for timed operations of the plurality of agents 18 in order to satisfy at least one safety rule, as described herein. In one or more embodiments, "transforming" the TIGA controller strategy to first instructions may correspond to determining first instructions based on the TIGA controller strategy. In one or more embodiments, dispatch device 16 such as via one or more of processing circuitry 42, processor 44, communication interface 40 is configured to cause (Block S110) signaling of the first instructions to the plurality of agents.

According to one or more embodiments, the processing circuitry 42 is further configured to receive information of time deviations from at least one of the plurality of agents 18, cause transmission of the information of time deviations, and receive a modified TIGA controller strategy that is based on the information of time deviations. The processing circuitry 42 is further configured to transform the modified TIGA controller strategy to second instructions for the plurality of agents 18, and cause signaling of the second instructions to the plurality of agents 18.

According to one or more embodiments, the TIGA controller strategy is configured to modify the at least one of a plurality of temporal plans by at least one of adding a time delay and adding a time constant. According to one or more embodiments, the TIGA controller strategy is configured to prevent occurrences of deadlocks among the plurality of agents 18 based at least on the at least one safety rule. According to one or more embodiments, the plurality of agents are a plurality of automated devices.

Having generally described arrangements for verification and controller synthesis, details for these arrangements, functions and processes are provided as follows, and which may be implemented by the node 14 and/or dispatch device 16.

Some embodiments provide verification and controller synthesis for operating one or more agents 18 within safety rules even when time deviations (jitter) occur in the execution environment.

Framework for Verification and Control

In order to verify and/or control plans before dispatch, plan transformation into formal models and runtime control rules may be performed. For this, a framework for flexible temporal planning, verification and controller synthesis is described herein. The overall architecture is presented in FIG. 8. Prior to dispatching the temporal plan to the robot or robot nodes (i.e., agents 18) via the dispatch device 16, the plan is verified to guarantee safety properties in the dispatched actions. The dispatch device 16 may also choose to add controlled delays between task steps, which may be indicated in the controller strategy, to ensure the deployed actions do not violate the required safety properties.

Planning Module: The temporal planner 12 (step (1)) takes the inputs from the domain request and the problem goal request to generate an (optimal) timed plan. Additional goal details may be incorporated in the planning environment (such as minimizing robot battery usage). This output plan is then decomposed by the plan decomposer (step (2)) to multi-agent plans, where each plan of the multi-agent plans may be run on individual robots. Note that this entails concurrent actions with timing constraints incorporated Plan Verification and Strategy Synthesis Module: The generated multi-agent plans are input to the UPPAAL-TIGA model translator (step (3)) of node 14, that generates timed game automata models with states, transitions and timing guards that are mapped to the individual plans of the multi-agent plans. The automata models are then appended such as by one or more of processing circuitry 30, processor 32, verification unit 22, and communication interface 28, etc., with realistic timing deviations (jitter) in the UPPAAL-TIGA model update (step (4)). The updated model is then verified with property verification (step (5)), with alternate strategies proposed in case the properties (i.e., safety properties/rules) are not satisfied. The specific controller strategy chosen such as by one or more of processing circuitry 30, processor 32, verification unit 22, and communication interface 28, etc., to be deployed is then synthesized (step (6)) to a format specified for deployment. This model also contains information about the zones that may be controlled, with additional delays or constraints incorporated.

Deployment Execution Module: The generated plans and control strategies are sent to the dispatch device 16 (step (7)). The ROS nodes and action lib modules perform the execution (step (8)) on the robots in the warehouse. The execution monitor 20 (step (9)) logs the execution output—in case the recorded temporal deviations exceed the planned strategies, a re-run of steps (4) to (8) may be performed.

Figure 8:
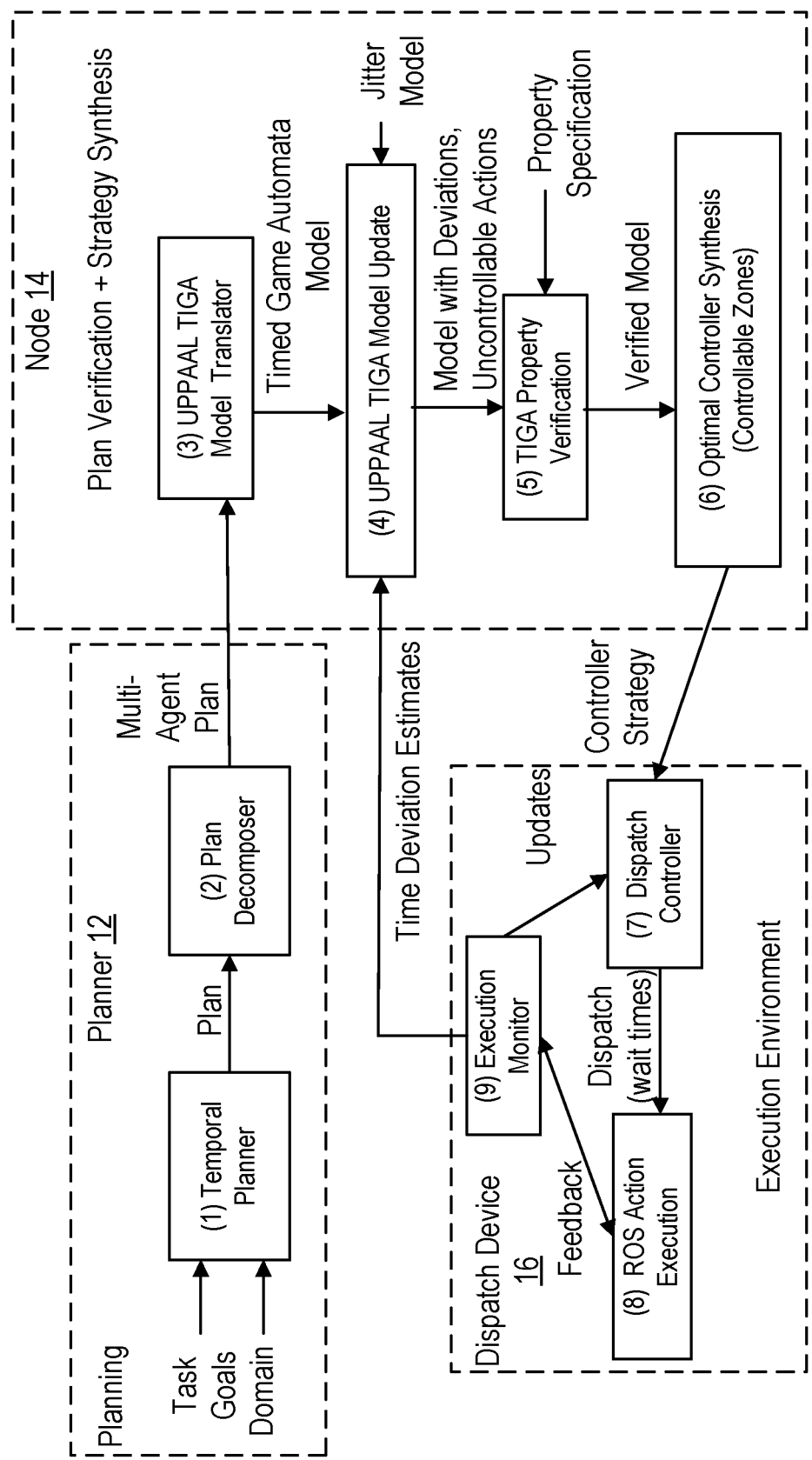
FIG. 8 is a diagram of a framework for plan verification and controller synthesis according to the principles in the present disclosure.

Therefore, the system of FIG. 8 provides one or more of the following advantages:
1. Transformation from a temporal plan (timed plan) to a timed game automata model.
2. Synthesis of optimal controllable zones to minimize the set of rules to be monitored for verification of a property (i.e., to verify at least one safety property or rule is satisfied).
3. Flexible dispatch of cobots by transforming the verified strategy to a dispatch format that introduces wait times with feedback.

Time Game Automata Transformation Rules

The following definitions and steps in FIG. 9 are edited in Latex format for ease of reference.

In order to study the individual robotic plans, timed automata models are used. To help ensure one-to-one mapping between plans and transitions, temporal plan timing constraints and plan actions are provided with exact specifications. Given an individual robot plan with a set of sequential temporal tasks T1(D1), ..., Tk(Dk), where Ti refers to the action label and Di the corresponding action duration, the transformation rules in FIG. 10 are used to transform individual robot plans to timed automata representation.

Figure 11:
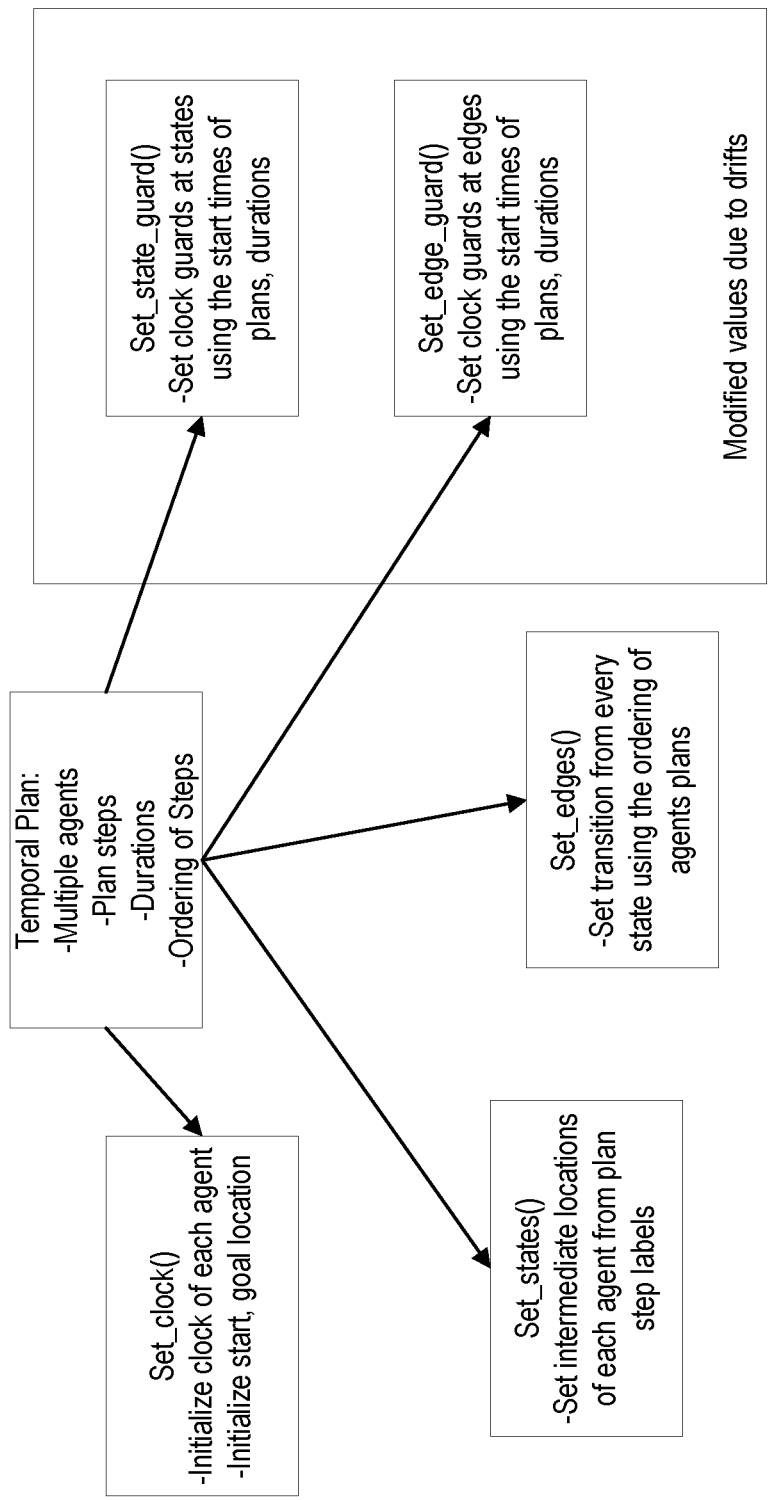
FIG. 11 is a diagram of a transformation from temporal/timed plans to time game automata formalisms according to the principles in the present disclosure.
Figure 12C:
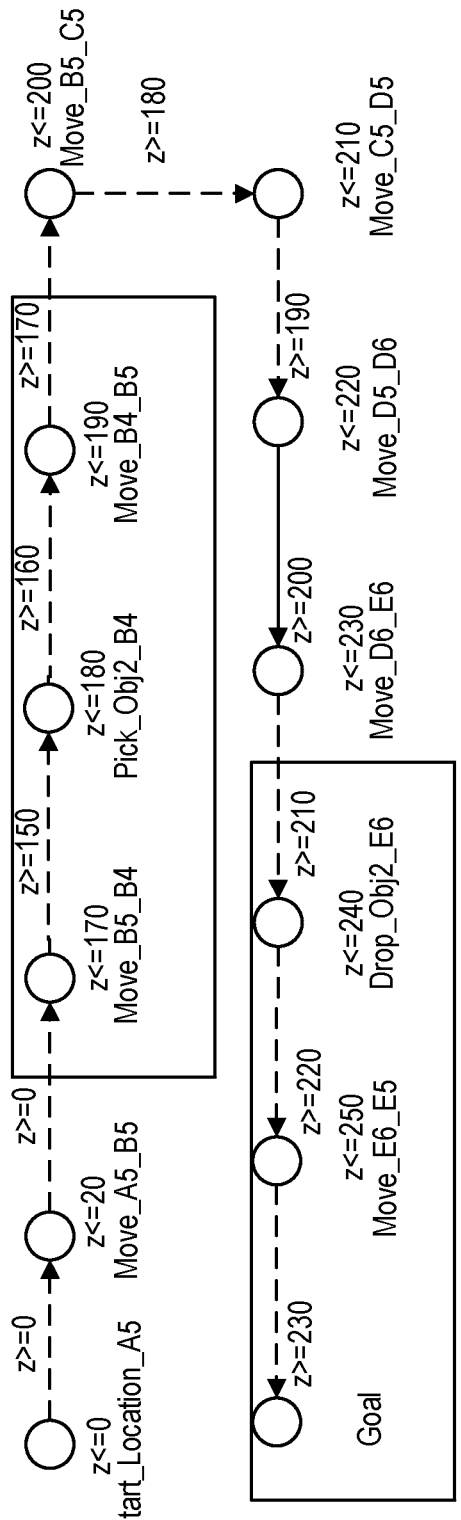
Figure 12D:
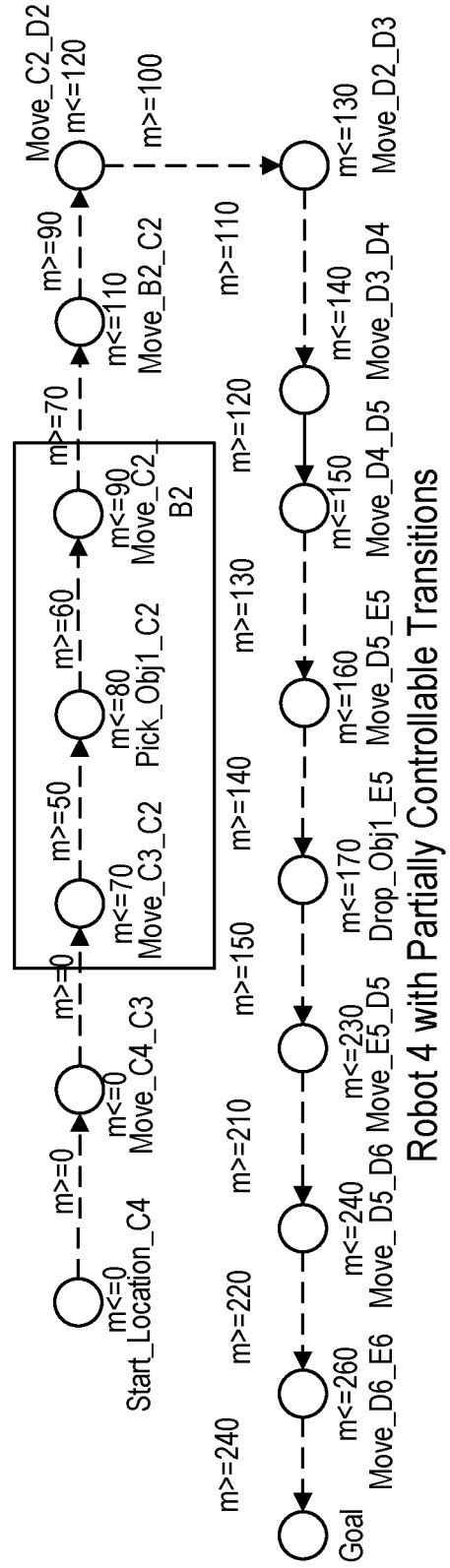

FIG. 11 is a diagram of the transformation from temporal plans to timed automata formalisms. In one or more embodiments, clock guards used in the edges and locations in the timed game automata may be perturbed/modified (provides inequality ranges) in order to study the execution of plans despite drifts.

For example, a timed/temporal plan may be determined for multiple agents, durations and ordering of steps. The timed plan, in set_clock(), may initialize clock of each agent and initialize a start and goal location. The timed plan, in set_states(), may set intermediate locations of each agent from plan step labels. The timed plan, in set_edges(), may set transitions from every state using the ordering of agent plans. The timed plan, in set_state_guard(), may set clock guards at states using the state times of plans and durations. The timed plan, in set_edge_guard(), may set clock guards at edges using the start, times of plans and durations. Node 14 such as by one or more of processing circuitry 30, processor 32, verification unit 22, and communication interface 28, etc., may modify one or more of set_state_guard( ) and set_edge_guard( ) such as to modified values to introduce time deviations or drift.

In one or more embodiments, in order to study the individual robotic plans, the models (i.e., TIGA models) presented in FIG. 12(a)-(d) are used. In particular, the models make use of controllable actions and uncontrollable actions. The dispatch device 16 has precedence in controllable cases whereas the environment having precedence in uncontrollable cases. In one or more embodiments, the dispatch device 16 continuously observes the system (moves and delays). The dispatch device 16 can then take the following actions: (i) wait (delay actions) (ii) controllable move or cause a move (iii) preventing delay with a move. In the Example of FIG. 12(a)-(d), Robot 1 and Human 2 are selected to have only uncontrollable transitions while Robot 3 and Robot 4 have a few controllable transitions. The objective is to still satisfy one or more safety properties despite deviations (i.e., time deviations or jitter) in the uncontrollable transitions in cobots and humans.

The advantage of invoking timed game automata in UPPAAL-TIGA is the ability to further synthesize strategies in case of uncontrollable events. This is further complicated by possible temporal deviations in execution, that must be satisfied.

Controller Strategy Synthesis

In order to study the effects of the execution deviating from the temporal plan, the generated clock constraints in the timed game automata are modified to include overlaps in clock guards (e.g., overlap of set_state_guard( ) and set_edge_guard()). In one or more embodiments, the state and action transitions originally planned are perturbed or modified by up to ±10 time units. This produces automata in FIG. 12(a)-(d) with overlapping timelines, that were not intended at plan time. Note that this automata, i.e., TIGA, only has a few controllable regions in Robot 3 and Robot 4 as indicated by the rectangular outline. It may be preferable to control these transitions such that properties are maintained during execution. The robots and humans should avoid collisions and deadlocks, despite the temporal deviations.

The objective is to generate a strategy for the dispatcher, i.e., dispatch device 16, such that the following property Strict Reachability with Avoidance (Until) is satisfied where this safety property specifics that a winning condition must be reached and a losing condition must be avoided. Note that other properties such as strict reachability and weak reachability may also be verified similarly. In particular, pure reachability specifies a "must reach winning condition" while weak reachability specifies "should reach win and must avoid a loss."

FIG. 13 is a diagram of various control properties. In this example, these control properties prevent three occurrences of deadlocks/collisions until the goal is reached. UPPAAL-TIGA, via node 14, generates the following winning strategy. Given the relative states of the robots and observed clock values, rules are generated to take transitions for Robot 3 and Robot 4. In one or more embodiments, one or more rules corresponds to one or more "when" statements in FIG. 14. These rules, when followed, help ensure "winning" (i.e., a winning strategy as illustrated in FIG. 14) against uncontrollable environmental conditions—maintaining the temporal ordering of robot events. The phrase "winning strategy" may correspond to the determination of a minimum number of transition rules (also referred to as control rules) needed to satisfy at least one safety rule and/or property.

Cobot Dispatch Module (i.e., Dispatcher Device 16)

The last stage of the Flexible Temporal Plan Dispatch system involves the deployment of the temporal plans and optimized dispatched strategies. In one or more embodiments, this step is demonstrated by the integration with simulation of physical robots running Robot Operating System (ROS). The temporal plans and optimized dispatched strategies are integrated using the ROS actionlib framework. The actionlib package allows creation of client-server applications to executed long-running goal tasks with feedback and pre-emption. In particular, in one or more embodiments, the dispatch device 16 may receive both the original temporal plans determined by planner 12 as well as the TIGA controller strategy to be followed when deviations are observed by monitor 20. For example, dispatcher device 16 may receive feedback from monitor 20 and may introduce delay or wait times to some tasks if deviations in the temporal plan(s) are noticed, thereby helping ensure that the original plan is maintained while minimizing end-to-end plan deadlines. The ActionClient periodically sends a goal task to the server with information about success criteria (state, time, location). The ActionServer attempts to perform the task (with robotic capabilities), with a final result sent in completion of the goal task.

Figure 15:
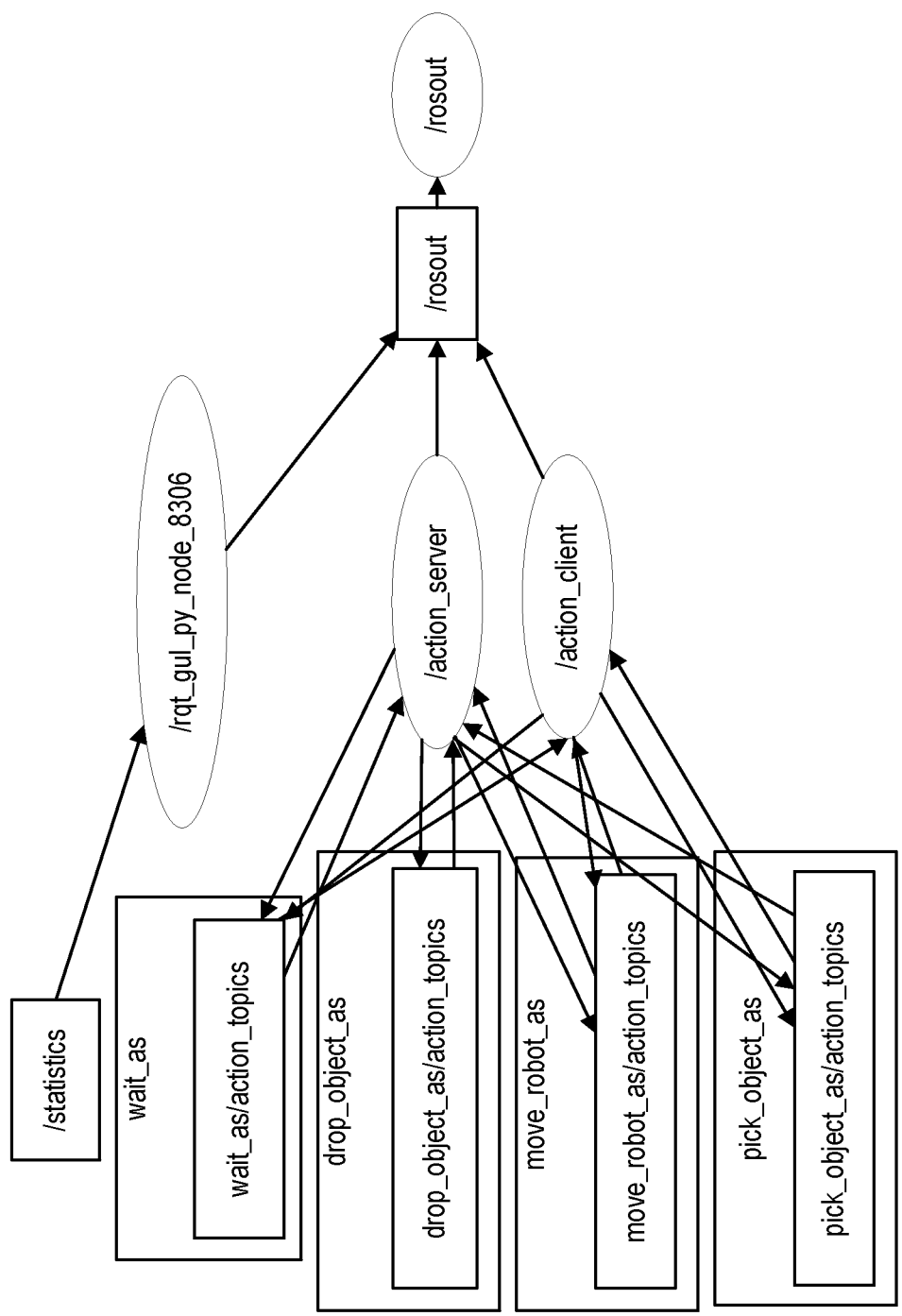
FIG. 15 is a diagram of a robot operating system (ROS) dispatch of strategies according to the principles in the present disclosure.

FIG. 15 is a diagram of ROS dispatch strategies according to one or more embodiments of the disclosure. In one or more embodiments, to integrate optimal dispatch strategies that maintain safety properties despite temporal deviations, the ROS nodes and messages in ROS actionlib as provided in FIG. 16 are used. Along with the move, pick and drop tasks seen in the grid scenario, an additional wait task is added, that can be enforced by the dispatch device 16, as illustrated in FIG. 16.

As discussed above, there are cases where the planned time bounds are exceeded, triggering an appropriate waiting time at a later stage according to the strategy. This allows for successful execution of planned goal tasks in a temporally sound, verifiably safe and flexible manner. The integration of the synthesized strategy into the ROS dispatch framework is performed in this manner.

Optimal Controller Zones Another aspect to consider is the complexity of the control strategy that is generated. As the complexity corresponds to transition rules on relative states and clock values of multiple agents, increasing the number of transition rules would imply additional complexity to the dispatch device 16. One or more embodiments described herein are designed to reduce the overhead of heavy uncertainty planning or runtime re-configurations, such that it is important to analyze the tradeoffs between choice of controllable robots and the number of transition rules generated by UPPAAL-TIGA. The following technique is used to compare two strategies ST_1 (time_1, rules_1) and ST_2 (time_2, rules_2):

Optimal Strategy (ST_1, ST_2) =
    if (time_1 <= time_2) then ST_1
        elseif (rules_1 <= rules_2) then ST_1
            else ST_2

Figure 17:
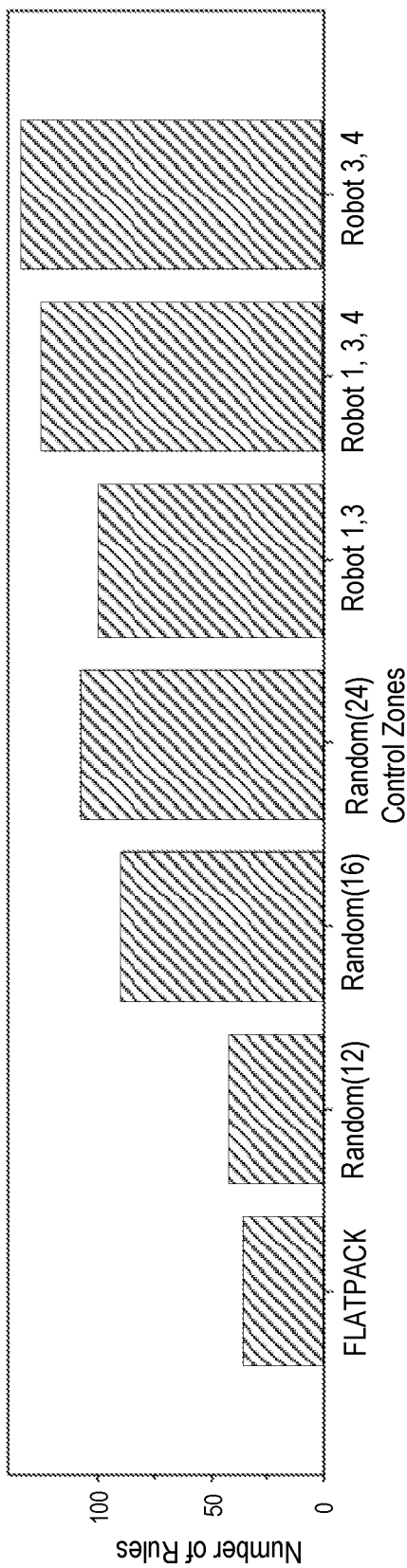
FIG. 17 is a graph of a number of control rules versus control zones according to the principles in the present disclosure.
Figure 18:
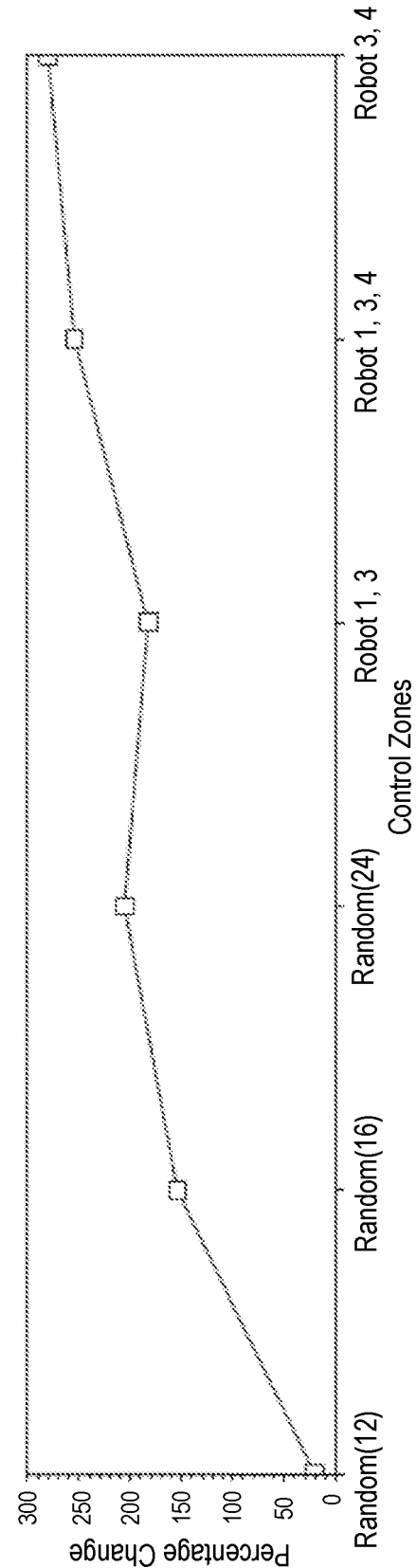
FIG. 18 is another graph of a percent change in a number of control rules versus control zones according to the principles in the present disclosure.

FIGS. 17 and 18 are diagram of control rules versus control zones. In particular, FIGS. 17 and 18 demonstrate the number of control rules (e.g., transition rules) for varying a number of controllable transitions in the timed automata from FIG. 12a-d. In one or more embodiments, the minimum number of rules are generated using Algorithm 1 (illustrated in FIG. 19) followed by an increase if random transitions that are added. This results in a 150% increase in the number of rules if Robots 1 and 3 are made controllable. In order to reduce the overhead on monitoring and enforcing a high number of control rules, a systematic approach to generate the controllable transitions effectively, so as to minimize this overhead, is implemented.

Figure 20:
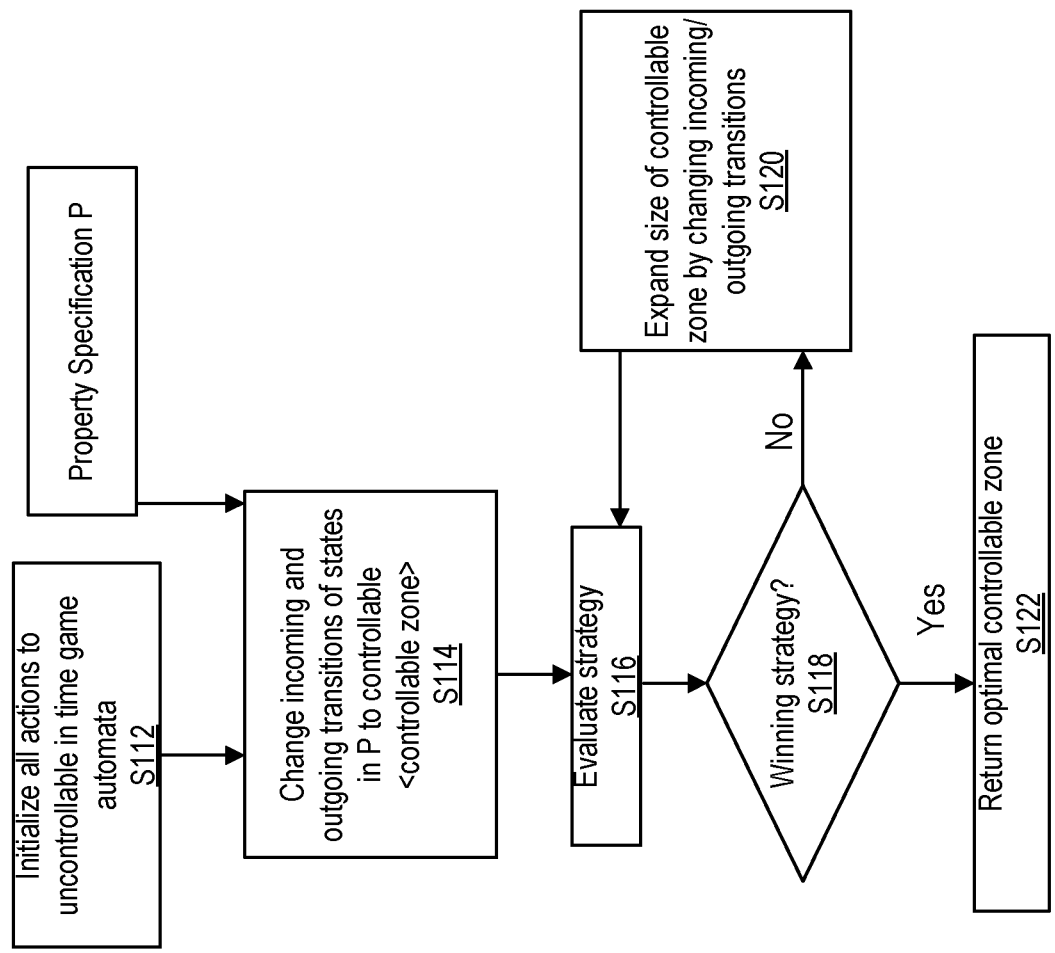
FIG. 20 is a flowchart for controller zone generation for meeting at least one safety property/rule according to the principles in the present disclosure.

FIG. 20 is a flowchart illustrating an optimal controller zone generation for a property as described herein. Node 14 such as by verification unit 22 in processing circuitry 30, processor 32, communication interface 28, etc., is configured to initialize (Block S112) all actions to uncontrollable in the time game automata (TIGA), as described herein. Node 14 such as by verification unit 22 in processing circuitry 30, processor 32, communication interface 28, etc., is configured to change (Block S114) incoming and outgoing transitions of states in P to controllable, i.e., create controllable zones, as described herein. Node 14 such as by verification unit 22 in processing circuitry 30, processor 32, communication interface 28, etc., is configured to evaluate (Block S116) strategy, as described herein. Node 14 such as by verification unit 22 in processing circuitry 30, processor 32, communication interface 28, etc., is configured to determine (Block S118) if a "winning strategy" is determine using the current controllable zone, as described herein.

Node 14 such as by verification unit 22 in processing circuitry 30, processor 32, communication interface 28, etc., is configured to, if a winning strategy is not determined, expand (Block S120) the size of a controllable zone (i.e., include more nodes in the rectangle outline of FIG. 12) by changing/modifying incoming and/or outgoing transitions. For example, given a specific sized controllable zone that corresponds to a first number of rules for controlling the zone, node 14 determines that a winning strategy cannot be found, i.e., the first number rules do not satisfy the at least one safety rule/property. Hence, node 14 expands the size of the controllable zone such as to also add to the first number of rules for controlling the expanded zone. Node 14 such as by verification unit 22 in processing circuitry 30, processor 32, communication interface 28, etc., is configured to, if a winning strategy is determined, return (Block S122) the optimal controllable zone, as described herein. This iterative approach, to initializing all actions in the TIGA to be uncontrollable and then expanding the controllable zone(s) until a winning strategy is determined, advantages determines a minimum number of rules to satisfy the least one safety property/rule even with the added jitter such that the complexity is kept low while still being able to avoid deadlocks even when time deviations occur.

Figure 21:
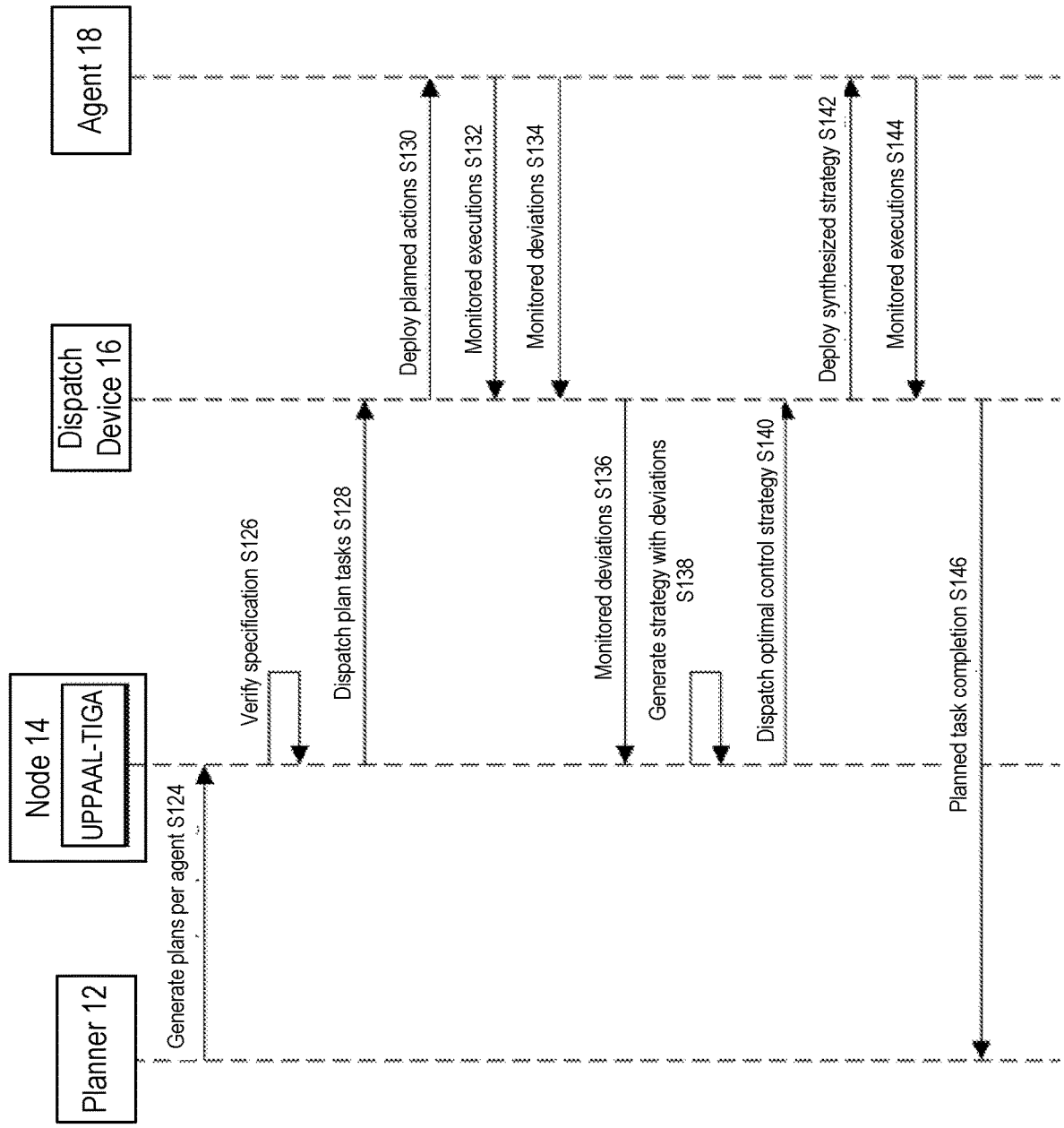
FIG. 21 is a sequence diagram of a plan verification, synthesis and dispatch process according to the principles in the present disclosure.

FIG. 21 is a sequence diagram of the plan verification, synthesis and dispatch where a winning strategy is generated based at least on monitored time deviations. In particular, planner 12 is configured to generate (S124) plans per agent, as is known in the art. UPPAAL-TIGA provided by node 14 is configured to verify (S126) specification, i.e., determine a winner strategy, as described herein. Dispatch device 16 is configured to receive (S128) the dispatch plan task, as described herein. Dispatch device 16 is configured to deploy (S130) planned actions to one or more agents 18 (e.g., robots), as described herein. Agent 18 such as via monitor 20 are configured to provide (S132-S134) monitored executions of the planned actions and monitored deviations to dispatch device 16.

Dispatch device 16 is configured to provide (S136) the monitored deviation(s) to UPPAAL-TIGA, as described herein. UPPAAL-TIGA that is provided by node 14 is configured to generate (S138) a strategy with deviation, i.e., generate a winning strategy using the monitored time deviation, as described herein. UPPAAL-TIGA is configured to dispatch (S140) the optimal control strategy, i.e., the winning strategy determined at S138, to dispatch device 16, as described herein. Dispatch device 16 is configured to deploy (S142) the synthesized strategy, i.e., winning strategy, to the agents 18 (e.g., robots), as described herein. Agent 18 is configured to provide (S144) monitored executions to dispatch device 16, as described herein. Dispatch device 16 is configured to determine (S146) one or more planned tasked have been completed to signal to planner 12 that the one or more planned tasked have been completed, as described herein.

Extension to Network Configurations

Figure 22:
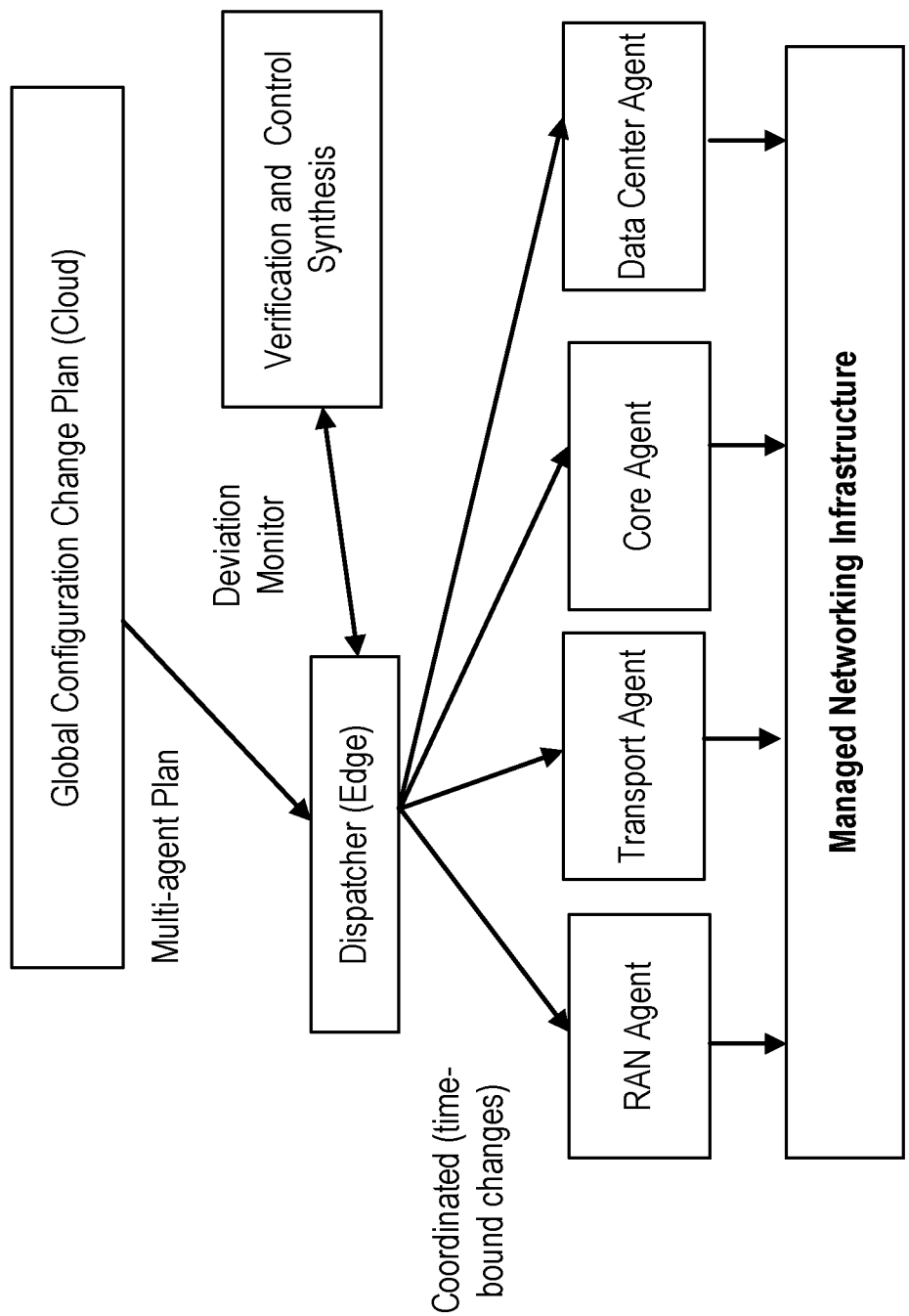
FIG. 22 is a network configuration for according to the principles in the present disclosure.

Given a global configuration change plan for a complex managed service (e.g., telecom infrastructure, 5G slice, etc.), the changes may take place in a time-bound manner. These may be assigned in parallel to multiple agents managing different parts of the infrastructure as illustrated in FIG. 22. Any deviation in the planned actions (failures, delay in re-configuration) can be effectively countered by alternate synthesized strategies (at the edge). The optimal number of controllable elements and the end-to-end delay have also been presented as described herein.

So, the technique may be applied to complex network configuration cases where time bound planned actions are needed for accurate reconfiguration.

Cloud Implementation In one or more embodiments, one or more functions of one or more devices described herein may be implemented in a cloud network and/or at the edge of a network such as at an edge node.

Therefore, one or more embodiments described herein provide one or more of the following:

1. Transformation rules that enable translating temporal plans to timed game automata models for verification of plans, including uncontrollable events.
2. Synthesis of effective dispatch strategies for cobot control with weaving of temporal uncertainties to ensure safe execution.
3. Generating optimal controllable zones to reduce complexity of dispatch rules.
4. Allows for verified plan deployments that cobots can safely execute within optimal time.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A node for temporal plan verification and timed game automata, TIGA, controller strategy synthesis for coordination of a plurality of agents, the node comprising:
   processing circuitry configured to:
      determine a first model of a plurality of temporal plans for timed operations of the plurality of agents violates at least one predefined safety rule;
      perform one-to-one mapping of one of sequential and partially ordered temporal tasks, in each of the plurality of temporal plans, to transitions in a respective TIGA model based at least on a plurality of transformation rules;
      modify at least one of the respective TIGA models by at least one time unit to create at least one temporal overlap between two respective TIGA models;
      generate the TIGA controller strategy for controlling the timed operations of at least a subset of the plurality of agents, the TIGA controller strategy meeting the at least one predefined safety rule and being based on the first model, the generating of the TIGA controller strategy being based on the one-to-one mapping and that at least one of the respective TIGA models that was modified; and
      cause transmission of the TIGA controller strategy to a dispatch device for translating the TIGA controller strategy to instructions for the plurality of agents.

2. The node of claim 1, wherein the first model of the plurality of temporal plans is a TIGA model.

3. The node of claim 2, wherein the TIGA model includes added timing deviations to the timed operations of the plurality of agents.

4. The node of claim 1, wherein the TIGA controller strategy for controlling the timed operations of at least the subset of the plurality of agents is configured to modify at least one temporal plan by at least one of adding a time delay and adding a time constraint.

5. The node of claim 1, wherein the TIGA controller strategy is configured to prevent occurrences of deadlocks among the plurality of agents based at least on the at least one safety rule.

6. The node of claim 1, wherein the processing circuitry is further configured to:
   initialize all states in the at least one TIGA model to be uncontrollable states;
   iteratively change a number of controlled states in the at least one TIGA model to determine at least one of a minimum number of control zones and at least one control zone size that satisfy the at least one safety rule; and
   the at least one of a minimum number of control zones and at least one control zone size corresponding to a minimum number of control rules for the at least one TIGA model to satisfy the at least one safety rule.

7. The node of claim 6, wherein each control rule includes at least one of:
   at least one rule for transitioning at least one of into and out of a state; and
   at least one clock value.

8. The node of claim 1, wherein the processing circuitry is further configured to receive a time deviation estimate that is based on monitoring of at least one of the plurality of agents, the TIGA controller strategy being based at least in part on the time deviation estimate.

9. A method implemented by a node for temporal plan verification and timed game automata, TIGA, controller strategy synthesis for coordination of a plurality of agents, the method comprising:
   determining a first model of a plurality of temporal plans for timed operations of the plurality of agents violates at least one predefined safety rule;
   performing one-to-one mapping of one of sequential and partially ordered temporal tasks, in each of the plurality of temporal plans, to transitions in a respective TIGA model based at least on a plurality of transformation rules;
   modifying at least one of the respective TIGA models by at least one time unit to create at least one temporal overlap between two respective TIGA models;
   generating the TIGA controller strategy for controlling the timed operations of at least a subset of the plurality of agents, the TIGA controller strategy meeting the at least one predefined safety rule and being based on the first model, the generating of the TIGA controller strategy being based on the one-to-one mapping and that at least one of the respective TIGA models that was modified; and
   causing transmission of the TIGA controller strategy to a dispatch device for translating the TIGA controller strategy to instructions for the plurality of agents.

10. The method of claim 9, wherein the first model of the plurality of temporal plans is a TIGA model.

11. The method of claim 10, wherein the TIGA model includes added timing deviations to the timed operations of the plurality of agents.

12. The method of claim 9, wherein the TIGA controller strategy for controlling the timed operations of at least the subset of the plurality of agents is configured to modify at least one temporal plan by at least one of adding time delay and adding a time constraint.

13. The method of claim 9, wherein the controller strategy is configured to prevent occurrences of deadlocks among the plurality of agents based at least on the at least one safety rule.

14. The method of claim 9, further comprising:
initializing all states in the at least one TIGA model to be uncontrollable states;
iteratively changing a number of controlled states in the at least one TIGA model to determine at least one of a minimum number of control zones and at least one control zone size that satisfy the at least one safety rule; and
the at least one of a minimum number of control zones and at least one control zone size corresponding to a minimum number of control rules for the at least one TIGA model to satisfy the at least one safety rule.

15. The method of claim 14, wherein each control rule includes at least one of:
at least one rule for transitioning at least one of into and out of a state; and
at least one clock value.

16. The method of claim 9, further comprising receiving a time deviation estimate that is based on monitoring of at least one of the plurality of agents, the TIGA controller strategy being based at least in part on the time deviation estimate.

* * * * *